(12) United States Patent
Kosemura et al.

(10) Patent No.: US 10,933,437 B2
(45) Date of Patent: Mar. 2, 2021

(54) DIE HEAD APPARATUS, COATING METHOD, AND LAMINATED BODY FORMING APPARATUS

(71) Applicant: Nissan Motor Co., Ltd., Yokohama (JP)

(72) Inventors: Tooru Kosemura, Kanagawa (JP); Masaki Saitoh, Kanagawa (JP); Hiroshi Yamashita, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 16/483,991

(22) PCT Filed: Jan. 31, 2018

(86) PCT No.: PCT/JP2018/003198
§ 371 (c)(1),
(2) Date: Aug. 6, 2019

(87) PCT Pub. No.: WO2018/168234
PCT Pub. Date: Sep. 20, 2018

(65) Prior Publication Data
US 2020/0009603 A1    Jan. 9, 2020

(30) Foreign Application Priority Data
Mar. 14, 2017   (JP) .............................. JP2017-048731

(51) Int. Cl.
*B05C 5/02*     (2006.01)
*B05D 1/26*     (2006.01)
(Continued)

(52) U.S. Cl.
CPC .......... *B05C 5/0245* (2013.01); *B05C 11/023* (2013.01); *B05D 1/26* (2013.01);
(Continued)

(58) Field of Classification Search
CPC ........... B05C 5/0245; B05C 11/02–023; B05C 11/04–048
See application file for complete search history.

(56) References Cited

U.S. PATENT DOCUMENTS 4,009,657 A * 3/1977 Bonanno ................. B41F 9/061
                                                      101/157
4,791,879 A * 12/1988 Eklund ................... B05C 11/04
                                                      118/410
(Continued)

FOREIGN PATENT DOCUMENTS

CN      205199857 U     5/2016
CN      205270037 U     6/2016
(Continued)

*Primary Examiner* — Dah-Wei D. Yuan
*Assistant Examiner* — Stephen A Kitt
(74) *Attorney, Agent, or Firm* — Global IP Counselors, LLP

(57) ABSTRACT

A die head apparatus is provided with a front blade, a rear blade, a center blade, and an internal impurity removal space. The front blade and the center blade are configured to form a pool of a slurry. The internal impurity removal space is positioned between the center blade and the rear blade. A distance separating the rear blade and the substrate is set to be smaller than the distance separating the center blade and the substrate.

18 Claims, 18 Drawing Sheets

(51) Int. Cl.
*B05D 1/42* (2006.01)
*B05C 11/02* (2006.01)
*H01M 4/04* (2006.01)
*H01M 4/88* (2006.01)
*H01M 8/124* (2016.01)

(52) U.S. Cl.
CPC ............ *B05D 1/42* (2013.01); *H01M 4/0409* (2013.01); *H01M 4/0411* (2013.01); *H01M 4/8828* (2013.01); *H01M 8/124* (2013.01)

(56) References Cited

U.S. PATENT DOCUMENTS

| | | | | |
|---|---|---|---|---|
| 5,665,163 | A * | 9/1997 | Li | B05C 1/0813 118/413 |
| 6,261,368 | B1 * | 7/2001 | Wight | B05C 5/0245 118/410 |
| 9,914,854 | B2 | 3/2018 | Traser et al. | |
| 2009/0165707 | A1 * | 7/2009 | Lee | B05C 11/041 118/108 |
| 2013/0004694 | A1 * | 1/2013 | Hitschmann | C09D 175/16 428/41.8 |

FOREIGN PATENT DOCUMENTS

| | | |
|---|---|---|
| CN | 106042642 A | 10/2016 |
| JP | 52-26202 A | 2/1977 |
| JP | S60-5480 U | 1/1985 |
| JP | 2000-189878 A | 7/2000 |
| JP | 2002-153797 A | 5/2002 |
| JP | 2003-10766 A | 1/2003 |
| JP | 2004-82059 A | 3/2004 |
| JP | 2011-50814 A | 3/2011 |
| JP | 2014-527480 A | 10/2014 |
| JP | 2016-59862 A | 4/2016 |
| WO | 02/24423 A1 | 3/2002 |
| WO | 2016/063612 A1 | 4/2016 |

* cited by examiner

DIE HEAD APPARATUS, COATING METHOD, AND LAMINATED BODY FORMING APPARATUS

CROSS-REFERENCE TO RELATED APPLICATIONS

This application is a U.S. national stage application of International Application No. PCT/JP2018/003198, filed on Jan. 31, 2018. The present application is based on Japan Patent Application No. 2017-048731 filed on Mar. 14, 2017, and the contents disclosed therein are incorporated herein as a whole by reference.

BACKGROUND

Technical Field

The present invention relates to a die head apparatus, a coating method, and a laminated body forming apparatus.

Background Art

For example, a die head apparatus that is used for application of a slurry is known (for example, refer to Japanese Laid-Open Patent Application No. 2003-10766.).

The slurry is prepared by dispersing a powdered material in a liquid medium, and contains impurities such as bubbles and dust. Therefore, there is the problem that bubble failure (impurity failure) may occur due to bubbles remaining on a coating film that is formed by application of the slurry, or that it may be difficult to form a coating film of uniform thickness. In particular, the problems described above are significant in a laminated body of coating films that are formed by repeated application of the slurry.

At the same time, a bubble removal device (dedicated device for removal of impurities) for removing the bubbles contained in the slurry is known (for example, refer to Japanese Laid-Open Patent Application No. 2011-50814.).

SUMMARY

Although it is possible to remove the bubbles contained in the slurry by using the bubble removal device before applying the slurry, this method has such problems as causing an increase in the size of the overall device, an increase in the cost of the device due to greater complexity of the device configuration, and a reduction in productivity due to an increase in the number of processes.

In order to solve the problem associated with the prior art described above, the object of the present invention is to provide a coating method and a die head apparatus that can form a coating film of uniform thickness without impurity failures and without a dedicated device for the removal of impurities, and a laminated body forming apparatus that can form a laminated body of the coating film.

One aspect of the present invention which achieves the object above is a die head apparatus for applying a slurry to a substrate that is transported to form a coating film, comprising a front blade, a rear blade, a center blade, and an internal impurity removal space. The front blade and the center blade are configured to form a slurry pool. The internal impurity removal space is positioned between the center blade and the rear blade. The distance separating the rear blade and the substrate is set smaller than the distance separating the center blade and the substrate.

Another aspect of the present invention which achieves the object above is a coating method for applying a slurry to a substrate that is transported to form a coating film. In the above-described coating method for forming the coating film with a uniform thickness: when the substrate passes the center blade, the slurry is applied to the substrate; when the substrate passes through the internal impurity removal space, the impurities contained in the coating film of the slurry that is applied to the substrate are removed by floating to the surface of the coating film and escaping therefrom; and when the substrate passes the rear blade, the surface of the coating film is smoothed.

Yet another aspect of the present invention which achieves the object above is a laminated body forming apparatus for forming a laminated body of a coating film on a transported substrate, comprising a plurality of the die head apparatuses, where the plurality of die head apparatuses are arranged in series along the substrate transport direction, and external impurity removal spaces for removing impurities that are contained in a coating film slurry are provided on downstream sides of the plurality of die head apparatuses in the transport direction.

By means of one aspect and another aspect of the present invention, since, after passing the center blade, the coating film slurry has small thickness, in the internal impurity removal space located between the center blade and the rear blade, the impurities contained in the coating film are removed by floating to the surface of the coating film and escaping. In addition, when the substrate passes the rear blade, the surface of the coating film is smoothed (corrected), thereby forming the coating film with uniform thickness. Thus, it is possible to provide a coating method and die head apparatus that can form a coating film of uniform thickness without impurity failures and without a dedicated device for the removal of impurities.

By means of yet another aspect of the present invention, in the coating film formed by the die head apparatus, the remaining impurities are removed in the external impurity removal space, after which another slurry is applied to the surface of the coating film by another die head apparatus, thereby forming a laminated body of the coating films. Thus, it is possible to provide a coating method and laminated body forming apparatus that can form a laminated body of the coating films of uniform thickness without impurity failures and without a dedicated device for the removal of impurities.

Other objects, features, and characteristics of the present invention should become apparent with reference to the preferred embodiments illustrated in the following descriptions and appended drawings.

DETAILED DESCRIPTION OF THE EMBODIMENTS

Embodiments of the present invention are described below with reference to the drawings. The dimensional ratios of the drawings are exaggerated for convenience of explanation and may differ from the actual ratios.

Figure 1:
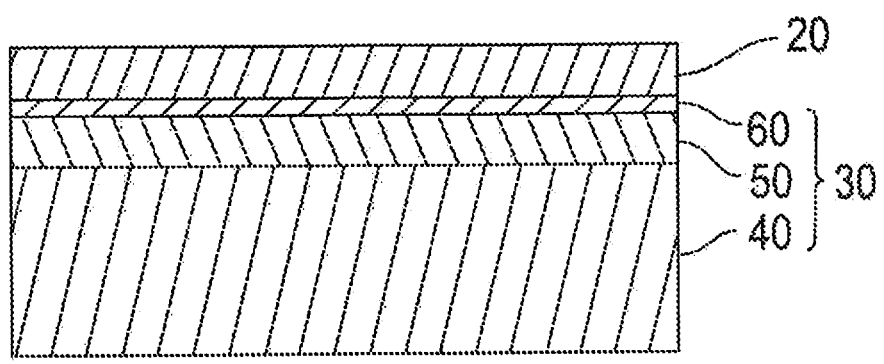
FIG. 1 is a cross-sectional view for explaining a half-cell layer of a fuel cell according to an embodiment of the present invention.

FIG. 1 is a cross-sectional view for explaining a half-cell layer of a fuel cell according to an embodiment of the present invention.

A fuel cell 10 according to the embodiment of the present invention is a solid oxide fuel cell (SOFC) having a cathode layer 20 and a half-cell layer 30, as shown in FIG. 1.

The cathode layer 20 is, for example, an air electrode layer having a thickness of 10-50 μm and is in contact with the half-cell layer 30. The cathode layer 20 has catalytic ability and electronic conductivity and comprises a conductive ceramic, for example.

The half-cell layer 30 is a laminated body comprising three layers, including a metal support layer 40, an anode layer 50, and a solid electrolyte layer 60.

The metal support layer 40 has a thickness of, for example, 100-800 μm. The metal support layer 40 is electronically conductive and has a function of supporting expansion and contraction of a battery. Specifically, the metal support layer 40 comprises a metal material, such as stainless steel.

The anode layer 50 is, for example, a fuel electrode layer having a thickness of 10-50 μm. The anode layer 50 has catalytic ability, electronic conductivity, and ionic conductivity. Specifically, the anode layer 50 contains an activation catalyst, a metal-based material, and a ceramic-based material.

The solid electrolyte layer 60 has, for example, a thickness of 1-30 μm, and is sandwiched by the cathode layer 20 and the anode layer 50. The solid electrolyte layer 60 has ionic conductivity, and comprises, for example, a ceramic-based material, such as stabilized zirconia.

Next, a laminated body forming apparatus 100 for forming the half-cell layer will be described.

Figure 2:
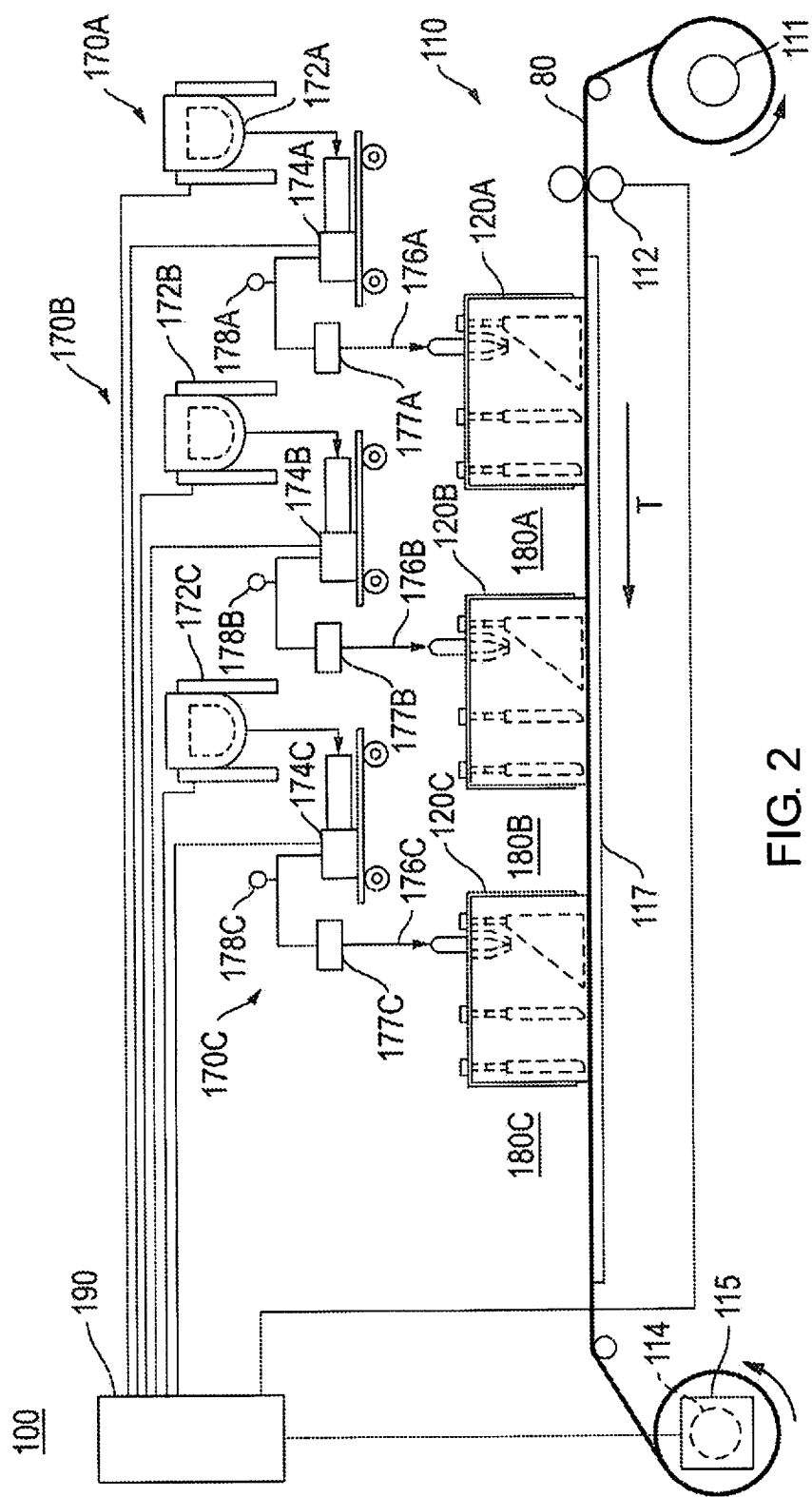
FIG. 2 is a side view for explaining a laminated body forming apparatus for forming the half-cell layer shown in FIG. 1.
Figure 3:
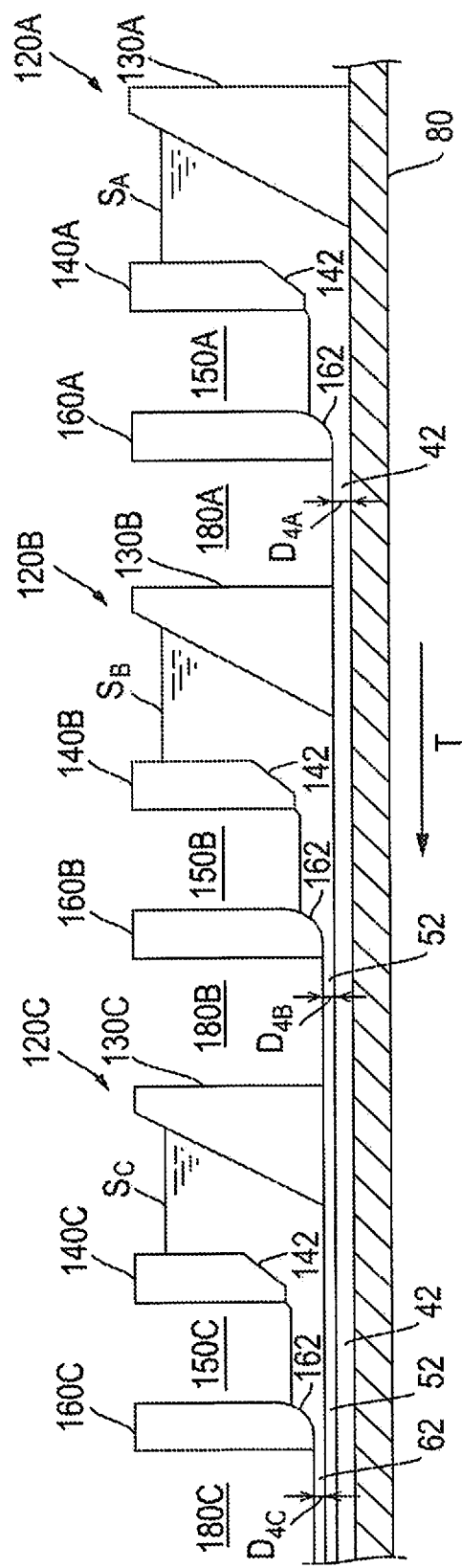
FIG. 3 is a schematic view for explaining the formation of a laminated body by the laminated body forming apparatus.

FIG. 2 is a side view for explaining the laminated body forming apparatus for forming the half-cell layer shown in FIG. 1, and FIG. 3 is a schematic view for explaining the formation of the laminated body by means of the laminated body forming apparatus.

As shown in FIGS. 2 and 3, the laminated body forming apparatus 100 is a roll-to-roll coating device that forms a laminated body of coating films 42, 52, 62 by applying three types of slurries $S_A$, $S_B$, $S_C$ on a thin-film sheet-like substrate 80. Reference symbols $D_{4A}$, $D_{4B}$, and $D_{4C}$ indicate the thicknesses of the coating films 42, 52, 62, and the reference symbol T indicates the transport direction of the substrate 80. A case in which bubbles (air bubbles) are contained as impurities in the coating films 42, 52, 62 in the present embodiment will be described.

The material of the substrate 80 is not particularly limited. However, in the present embodiment, the formed laminated body of the coating films 42, 52, 62 is peeled off of the substrate 80; thus, the material of the substrate 80 is preferably a resin having good releasability. Examples of resins having good releasability include polyethylene terephthalate (PET), polytetrafluoroethylene (PTFE), and silicone resin.

The laminated body forming apparatus 100 comprises a transport device 110, die head apparatuses 120A, 120B, 120C, slurry supply devices 170A, 170B, 170C, external bubble removal spaces (external impurity removal spaces) 180A, 180B, 180C, and a control device 190.

As shown in FIG. 2, the transport device 110 is used for transporting the substrate 80 and includes a feed roll 111, a drive roller 112, a take-up roll 114, a tension control device 115, and a support table 117.

The feed roll 111, around which the substrate 80 is wound in the form of a roll, is rotatably disposed. The drive roller 112 is used to feed the substrate 80 from the feed roll 111 and to supply the substrate to the die head apparatuses 120A, 120B, 120C by means of friction force.

The drive roller 112 is configured to have a variable rotational speed so as to be capable of adjusting the transport speed of the substrate 80. The drive roller 112 is, for example, a resin roller formed from a resin having good a coefficient of friction, a rubber roller formed from a rubber having a good coefficient of friction, or a metal roller having a coating layer of resin or rubber that has a good coefficient of friction.

The installed number and positions of the drive rollers 112 are appropriately set in consideration of the materials of the slurries, the installed number of the die head apparatuses, the transport distance, and the like. For example, the drive roller 112 can be disposed downstream of the die head apparatus 120C in the transport direction T, or downstream of each of the die head apparatuses 120A, 120B, 120C in the transport direction T.

The take-up roll 114 is rotatably disposed and is used to take up the substrate 80, on which the laminated body of the coating films 42, 52, 62 is disposed, in the form of a roll. The tension control device 115 controls the tension of the substrate 80 by adjusting the rotational speed of the take-up roll 114 and is configured to suppress, for example, the formation of wrinkles in the substrate 80, the stretching of the substrate 80, and the breakage of the substrate 80.

The support table 117 supports the back surface of the substrate 80 to be transported, and the contact surface with the substrate 80 has a good degree of smoothness in order to ensure the smooth transport of the substrate 80. From the standpoint of precise flatness, the support table 117 is preferably formed from a glass plate, a stone surface plate, or a stainless-steel plate, but no limitation is imposed thereby. For example, the material of the support table 117 is appropriately selected in consideration of cost and weight, in addition to precise flatness.

The die head apparatuses 120A, 120B, 120C are disposed in series and adjacent to each other in the transport direction T of the substrate 80 (refer to FIG. 3). The die head apparatus 120A is configured to form the coating film 42 which constitutes the metal support layer 40 of the half-cell layer 30. The die head apparatus 120B is configured to form the coating film 52 which constitutes the anode layer 50 of the half-cell layer 30. The die head apparatus 120C is configured to form the coating film 62 which constitutes the solid electrolyte layer 60 of the half-cell layer 30.

The slurry supply devices 170A, 170B, 170C include slurry tanks 172A, 172B, 172C, pumps 174A, 174B, 174C, and piping systems 176A, 176B, 176C.

The slurry tanks 172A, 172B, 172C accommodate slurries $S_A$, $S_B$, $S_C$ that form the coating films 42, 52, 62. The viscosity of the slurries $S_A$, $S_B$, $S_C$ is, for example, 5,000-50,000 cP. The pumps 174A, 174B, 174C are gear pumps, such as mono pumps or Viking pumps, or are screw pumps, and are used to feed the slurries $S_A$, $S_B$, $S_C$.

The slurry $S_A$ contains powder of the material that constitutes the metal support layer 40. The slurry $S_B$ contains powder of the material that constitutes the anode layer 50. The slurry $S_C$ contains powder of the material that constitutes the solid electrolyte layer 60. In addition to the above, the slurries $S_A$, $S_B$, $S_C$ appropriately contain a dispersion medium, an additive, and the like. The dispersion medium is, for example, an alcohol solvent, an ether solvent, an ester solvent, a ketone solvent, a cyclic ether solvent, or an aromatic hydrocarbon solvent. The additive is, for example, a sintering aid or a thickener.

The piping systems 176A, 176B, 176C connect the slurry tanks 172A, 172B, 172C, the pumps 174A, 174B, 174C, and the die head apparatuses 120A, 120B, 120C, and also include filters 177A, 177B, 177C and pressure gauges 178A, 178B, 178C.

The filters 177A, 177B, 177C are configured to remove large dust, aggregates, etc., contained in the slurries $S_A$, $S_B$, $S_C$. The pressure gauges 178A, 178B, 178C are used to detect the supply pressure of the slurries $S_A$, $S_B$, $S_C$.

The external bubble removal spaces 180A, 180B, 180C are provided downstream of the die head apparatuses 120A, 120B, 120C, respectively, in the transport direction T and are configured to remove bubbles (impurities) contained in the coating films 42, 52, 62 (refer to FIG. 3). The external bubble removal spaces 180A, 180B, 180C also have the function of securing the time required for leveling, drying, and curing the coating films 42, 52, 62 and facilitating the stacking. Accordingly, since the occurrence of mixing (mixing) at the interfaces of the coating films 42, 52, 62 is suppressed, there is excellent flexibility in the applicable slurry types.

The control device 190 comprises a control circuit having a microprocessor, and the like, which execute various controls and calculation processes in accordance with a program. The control device 190 is connected to the drive roller 112, the tension control device 115, the slurry tanks 172A, 172B, 172C, and the pumps 174A, 174B, 174C, and various functions of the laminated body forming apparatus 100 are realized by means of execution of the corresponding programs by the control device 190.

The slurry supply device is not limited to the configuration described above; it is also possible to apply, for example, a dispenser that is capable of discharging the slurry. The dispenser capable of discharging the slurry is, for example, a dispenser manufactured by HEISHIN Ltd., in which is incorporated a structure similar to a mono pump.

Next, the die head apparatus is described in detail.

Figure 4:
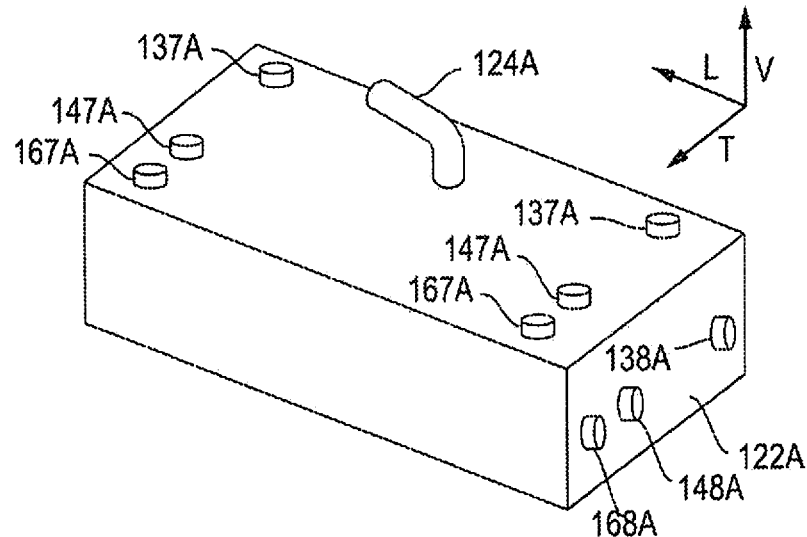
FIG. 4 is a perspective view for explaining a die head apparatus shown in FIG. 2.
Figure 5:
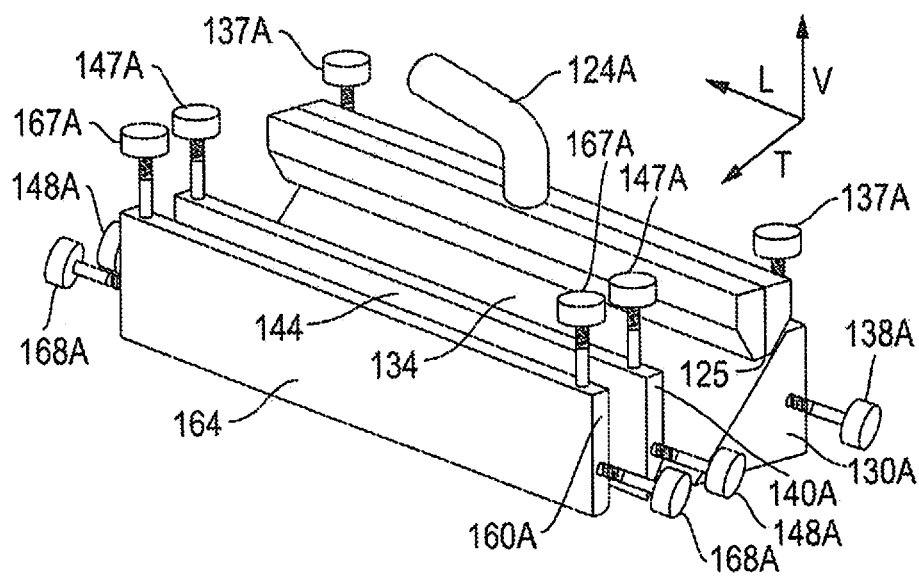
FIG. 5 is a perspective view for explaining an internal structure of the die head apparatus.
Figure 6:
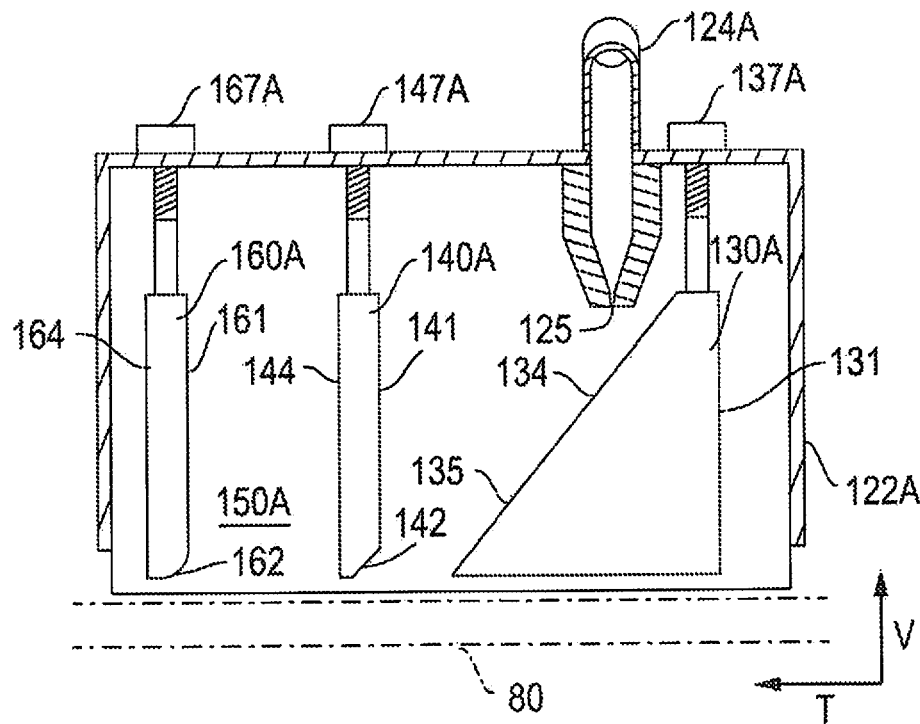
FIG. 6 is a cross-sectional view for explaining the internal structure of the die head apparatus.
Figure 7:
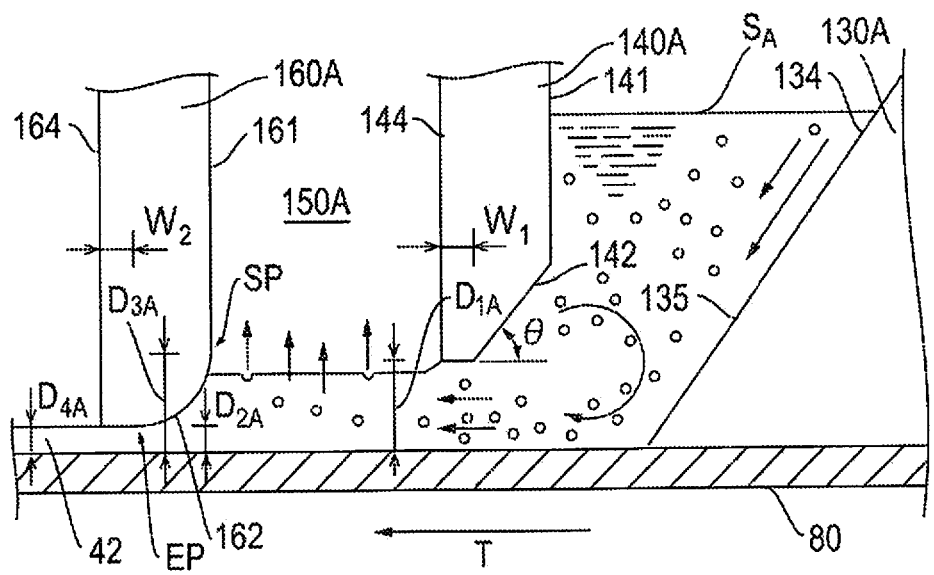
FIG. 7 is a schematic view for explaining the formation of the coating film by the die head apparatus.

FIG. 4 is a perspective view for explaining the die head apparatus shown in FIG. 2; FIGS. 5 and 6 are a perspective view and a cross-sectional view, respectively, for explaining an internal structure of the die head apparatus; and FIG. 7 is a schematic view for explaining the formation of the coating film by the die head apparatus.

As shown in FIGS. 4-6, the die head apparatus 120A comprises a casing 122A, a supply part 124A, a front blade 130A, a center blade 140A, an internal bubble removal space (internal impurity removal space) 150A, a rear blade 160A, an adjustment screws 137A, 147A, 167A, and fixing screws 138A, 148A, 168A.

The casing 122A is essentially rectangular and has a bottom surface that faces the transported substrate 80 and an upper surface positioned on the opposite side of said bottom surface. An opening for applying the slurry $S_A$ to the substrate 80 is formed on the bottom surface of the casing 122A. The supply part 124A is disposed on the upper surface of the casing 122A.

The supply part 124A has a slit 125, to which the piping system 176A of the slurry supply device 170A is connected. The slit 125 is disposed at the outlet of the supply part 124A and is configured to evenly supply the slurry $S_A$ in a lateral direction L orthogonal to the transport direction T (refer to FIG. 5). The slit 125 can be appropriately omitted as deemed necessary.

The supply width of the slurry $S_A$ corresponds to the length of the slit 125 along the lateral direction L orthogonal to the transport direction T. The supply thickness of the slurry $S_A$ corresponds to the width of the slit 125 in the transport direction T.

The front blade 130A has a right triangular cross section and extends in the lateral direction L (refer to FIGS. 5 and 6). The front blade 130A has a front surface 131 positioned on the upstream side in the transport direction T and a back surface 134 positioned on the downstream side in the transport direction T. The front surface 131 extends in a vertical direction V with respect to the transport direction T. The back surface 134 has an inclined surface 135 that corresponds to the hypotenuse of a right triangle. The inclined surface 135 is positioned immediately below the slit 125 and is configured such that the slurry $S_A$ flows downward toward the center blade 140A. The angle of inclination of the back surface 134 is appropriately set in consideration of the viscosity of the slurry $S_A$, and the like.

The adjustment screw 137A is connected to the upper portion of the front blade 130A and is configured to be capable of moving the front blade 130A along the vertical direction V. Accordingly, it is possible to change the distance separating the front blade 130A and the substrate 80 by adjusting the adjustment screw 137A. For example, the distance separating the front blade 130A from the substrate 80 is set so that there is no interference with the passage of the substrate 80 and so that the slurry $S_A$ does not flow out.

The fixing screw 138A is positioned to face a side surface of the front blade 130A. The fixing screw 138A is configured to fix the position of the front blade 130A, which is adjusted by the adjustment screw 137A, by abutting the side surface of the front blade 130A.

The center blade 140A is positioned downstream of the front blade 130A in the transport direction T, has an essentially rectangular cross section, and extends in the lateral direction L (refer to FIGS. 5 and 6). The center blade 140A has a front surface 141 positioned on the upstream side in the transport direction T and a back surface 144 positioned on the downstream side in the transport direction T. The front surface 141 faces the back surface 134 of the front blade 130A and has an irregularly shaped portion 142. The center blade 140A is configured to form a pool of the slurry $S_A$ together with the front blade 130A.

The adjustment screw 147A is connected to the upper portion of the center blade 140A and is configured to be capable of moving the center blade 140A in the vertical direction V. Thus, it is possible to change the distance separating the center blade 140A and the substrate 80 by adjusting the adjustment screw 147A.

The fixing screw 148A is positioned to face a side surface of the center blade 140A. The fixing screw 148A is configured to fix the position of the center blade 140A, which is adjusted by the adjustment screw 147A, by abutting the side surface of the center blade 140A.

Since the slurry $S_A$ has a high viscosity (for example, 5,000-50,000 cP) and the liquid pressure is high inside the slurry $S_A$ pool, the bubbles contained in the slurry $S_A$ do not readily rise. In addition, because there is normally a high pressure loss, bubbles remain in the gap between the center blade 140A and the substrate 80 and gather to form large bubbles. Therefore, there is the risk that bubble failure (impurity failure) occurs in the coating film that is formed by passing the center blade 140A.

However, the irregularly shaped portion 142 of the front surface 141 of the center blade 140A comprises a sloped portion that is inclined in the transport direction T and functions as a rotation application portion that applies a rotational force to the slurry $S_A$ in the pool (refer to FIG. 7).

Therefore, the bubbles contained in the slurry $S_A$ do not remain there, and are efficiently fed to the back surface 144 of the center blade 140A without aggregating to form large bubbles, so that the occurrence of bubble failure is suppressed.

The angle of inclination θ of the irregularly shaped portion (sloped portion) 142, although dependent on the viscosity of the slurry $S_A$, is preferably 30-60°. The angle of inclination θ of the irregularly shaped portion (sloped portion) 142 preferably does not vary with respect to the lateral direction L. Variation in the width $W_1$ of the distal end portion of the center blade 140A is preferably suppressed within the range of 0.003-0.1 mm, in absolute value. The width $W_1$, although dependent on the viscosity of the slurry $S_A$, can be set to 0 mm, that is, to an acute angle.

The rotational force of the slurry $S_A$ is not limited to being controlled by use of the angle of inclination θ and may be controlled by use of, for example, the pressure at which the slurry $S_A$ passes the center blade 140A (passage pressure). The passage pressure can be adjusted by increasing the transport speed of the substrate 80 or pressurizing the slurry $S_A$ in the pool.

The rear blade 160A is positioned downstream of the center blade 140A in the transport direction T, has an essentially rectangular cross section, and extends in the lateral direction L (refer to FIGS. 5 and 6). The rear blade 160A has a front surface 161 positioned on the upstream side in the transport direction T and a back surface 164 positioned on the downstream side in the transport direction T. The front surface 161 faces the back surface 144 of the center blade 140A and has an irregularly shaped portion 162.

The adjustment screw 167A is connected to the upper portion of the rear blade 160A and is configured to be capable of moving the rear blade 160A along the vertical direction V. Accordingly, it is possible to change the distance separating the rear blade 160A and the substrate 80 by adjusting the adjustment screw 167A.

The fixing screw 168A is positioned to face a side surface of the rear blade 160A. The fixing screw 168A is configured to fix the position of the rear blade 160A, which is adjusted by the adjustment screw 167A, by abutting the side surface of the rear blade 160A.

The distance $D_{2A}$ separating the rear blade 160A and the substrate 80 is set smaller than the distance $D_{1A}$ separating the center blade 140A and the substrate 80 (refer to FIG. 7). Accordingly, the surface of the coating film of the slurry $S_A$ is smoothed (corrected) when the substrate passes the rear blade 160A by using an ironing effect of the press, thereby forming the coating film 42 with a uniform thickness.

The irregularly shaped portion 162 comprises a quarter-circle (fan-shaped) curved portion. The distance $D_{3A}$ separating the substrate 80 and the start position SP of the irregularly shaped portion (curved portion) 162 is set larger than the distance $D_{1A}$ separating the center blade 140A and the substrate 80. Accordingly, the irregularly shaped portion (curved portion) 162 functions as a guide portion that guides the bubbles contained in the coating film to the surface of the coating film to thereby efficiently remove the air bubbles contained in the coating film.

The variation in the width $W_2$ of the distal end portion of the rear blade 160A at the end position EP of the irregularly shaped portion (curved portion) 162 is preferably suppressed within the range of 0.003-0.1 mm, in absolute value. The width $W_2$, although dependent on the viscosity of the slurry $S_A$, can be set to 0 mm, that is, to an acute angle.

The internal bubble removal space 150A is positioned between the center blade 140A and the rear blade 160A and is provided in order to remove bubbles (impurities) contained in the coating film of the slurry $S_A$, which are applied to the substrate 80 (refer to FIGS. 6 and 7).

That is, after the slurry $S_A$ passing the center blade 140A, the slurry $S_A$ has a small thickness and the liquid pressure is decreased, so that the bubbles readily rise. In addition, there is also the effect that, when the dispersion medium in the slurry evaporates, air bubbles are entrained to the surface. Accordingly, in the internal bubble removal space 150A, the bubbles are easily removed by floating to the surface of the coating film and escaping. The depressions on the surface created by the bubbles escaping are pressed when passing the rear blade 160A and smoothed, thereby ensuring that the coating film 42 has a uniform thickness.

The materials of the front blade 130A, the center blade 140A, and the rear blade 160A are preferably 400 series stainless steel, 600 series stainless steel, cemented carbide, or the like from the standpoint of precise flatness and parallelism. At least the surfaces of the front blade 130A, the center blade 140A, and the rear blade 160A that come into contact with the slurry $S_A$ are preferably lapped in order to prevent inhibition of the flowability of the slurry $S_A$ and contamination due to aggregation.

The die head apparatuses 120B, 120C have essentially the same configuration as the die head apparatus 120A; thus, similar reference symbols have been assigned to members having similar functions, and the descriptions thereof have been omitted to avoid redundancy.

Since the substrate 80 on which the coating film has been formed is supplied to the die head apparatuses 120B, 120C, the respective distances separating the front blades 130B, 130C, the center blades 140B, 140C, and the rear blades 160B, 160C from the substrate 80 are appropriately set in consideration of the thicknesses $D_{4A}$, $D_{4B}$ of the coating film (refer to FIG. 3).

For example, the distance separating the front blade 130B of the die head apparatus 120B from the substrate 80 is set so that there is no interference with the passage of the substrate 80 on which the coating film 42 with the thickness $D_{4A}$ is formed, and so that the slurry $S_B$ does not flow out. The distance separating the front blade 130C of the die head apparatus 120C from the substrate 80 is set so that there is no interference with the passage of the substrate 80 on which the coating film 42 with the thickness $D_{4A}$ and the coating film 52 with the thickness $D_{4C}$ are formed, and so that the slurry $S_C$ does not flow out.

As described above, by using the die head apparatus according to the present embodiment, it is possible to form the coating film of uniform thickness without bubble failures (impurity failures) and without using a dedicated bubble removal device (for the removal of impurities). In addition, by using the laminated body forming apparatus according to the present embodiment, in the coating film formed by the die head apparatus, the remaining impurities are removed in the external impurity removal space, after which another slurry is applied to the surface thereof by another die head apparatus, thereby forming a laminated body of the coating film. Accordingly, it is possible to form the laminated body of the coating film of uniform thickness without bubble failures (impurity failures) and without using a dedicated bubble removal device (for removal of impurities).

The number of die head apparatuses provided in the laminated body forming apparatus is not limited to three and is appropriately set in accordance with, for example, the configuration of the laminated body to be formed. In addition, a single die head apparatus may be used by itself.

From the standpoint of suppressing unexpected contamination and admixtures of foreign objects in the coating film, the laminated body forming apparatus is preferably installed in a cleanroom.

The laminated body forming apparatus is not limited to the roll-to-roll system, and a roll-to-sheet system may be applied as well.

The laminated body forming apparatus and the die head apparatus are not limited to a mode that is applied to forming the half-cell layer of the solid oxide fuel cell (SOFC) and may be applied to the formation of layers that constitute a lithium-ion battery or a polymer electrolyte membrane fuel cell (PEM-FC).

For example, in the case of application to a lithium-ion battery, the substrate is the current collector made from a metal film such as copper foil, aluminum foil, or stainless steel foil, and the slurry contains a powder of a material constituting the active material layer. In the case of application to a polymer electrolyte membrane fuel cell, the substrate is the electrolyte membrane, and the slurry contains a powder of a material constituting the catalyst layer. Alternatively, the substrate is a resin sheet (auxiliary material) made of a PTFE sheet or a PET sheet, the slurry contains a powder of a material constituting the catalyst layer and is attached to a separately formed electrolyte membrane. The resin sheet is peeled off of the catalyst layer at an appropriate timing.

The coating method to which the laminated body forming apparatus 100 is applied will now be described.

Figure 8:
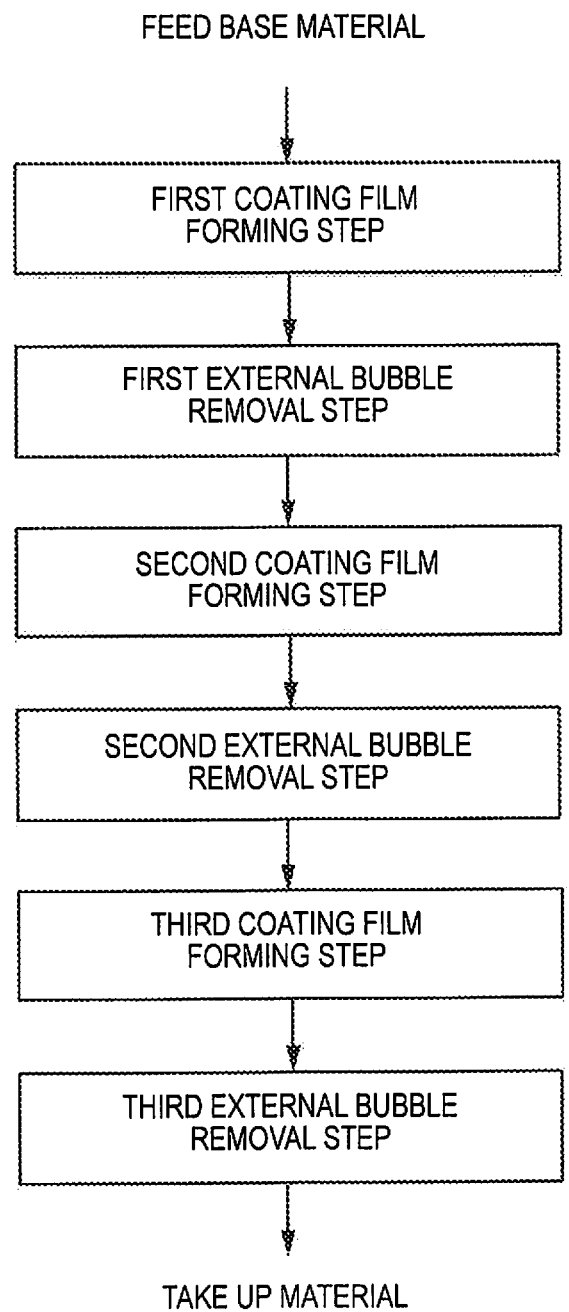
FIG. 8 is a flow chart for explaining a coating method according to an embodiment of the present invention.

FIG. 8 is a flow chart for explaining the coating method according to an embodiment of the present invention. The functions corresponding to the steps of the flow chart shown in FIG. 8 are realized by using execution of the corresponding programs by the control device 190.

The coating method according to the embodiment of the present invention is used for coating three types of the slurries $S_A$, $S_B$, $S_C$ on the thin film sheet-like substrate 80 to form the laminated body of the coating films 42, 52, 62, and, as shown in FIG. 8, comprises a first coating film formation step, a first external bubble removal step (first external impurity removal step), a second coating film formation step, a second external bubble removal step (second external impurity removal step), a third coating film formation step, and a third external bubble removal step (third external impurity removal step).

In the first coating film formation step, the slurry $S_A$ is supplied from the slurry supply device 170A to the die head apparatus 120A, and the coating film 42 with the thickness $D_{4A}$ is formed on the substrate 80 (refer to FIG. 3). The slurry $S_A$ contains a powder of a material constituting the metal support layer 40 of the half-cell layer 30, and thus the coating film 42 constitutes the metal support layer 40.

The substrate 80, wound in a roll around the feed roll 111 and fed from the feed roll 111 by means of the friction force of the drive roller 112, is continuously transported toward the take-up roll 114 via the die head apparatus 120A, the external bubble removal space 180A, the die head apparatus 120B, the external bubble removal space 180B, the die head apparatus 120C, and the external bubble removal space 180C.

In the first external bubble removal step, the bubbles contained in the coating film 42 are removed when the substrate 80 on which the coating film 42 is formed passes through the external bubble removal space 180A provided downstream of the die head apparatus 120A in the transport direction T.

In the second coating film formation step, the slurry $S_B$ is supplied from the slurry supply device 170B to the die head apparatus 120B, and the coating film 52 with the thickness $D_{4B}$ is formed on the substrate 80. The slurry $S_B$ contains a powder of a material constituting the anode layer 50 of the half-cell layer 30, and thus the coating film 52 constitutes the anode layer 50.

In the second external bubble removal step, the bubbles contained in the coating film 52 are removed when the substrate 80 on which the coating films 42, 52 are formed passes through the external bubble removal space 180B provided downstream of the die head apparatus 120B in the transport direction T.

In the third coating film formation step, the slurry $S_C$ is supplied from the slurry supply device 170C to the die head apparatus 120C, and the coating film 62 with the thickness $D_{4C}$ is formed on the substrate 80. The slurry $S_C$ contains a powder of a material constituting the solid electrolyte layer 60 of the half-cell layer 30, and thus the coating film 62 constitutes the solid electrolyte layer 60.

In the third external bubble removal step, the bubbles contained in the coating film 62 is removed when the substrate 80 on which the coating films 42, 52, 62 are formed passes through the external bubble removal space 180C provided downstream of the die head apparatus 120C in the transport direction T. The substrate 80 on which the coating films 42 52, 62 are formed is then wound in a roll around the take-up roll 114.

After being peeled off of the substrate 80, the laminated body of the coating films 42, 52, 62 is subjected to, for example, a degreasing step and a firing step to become the half-cell layer 30 comprising the metal support layer 40, the anode layer 50, and the solid electrolyte layer 60.

The first coating film forming step to which the die head apparatus 120A is applied will now be described in detail.

Figure 9:
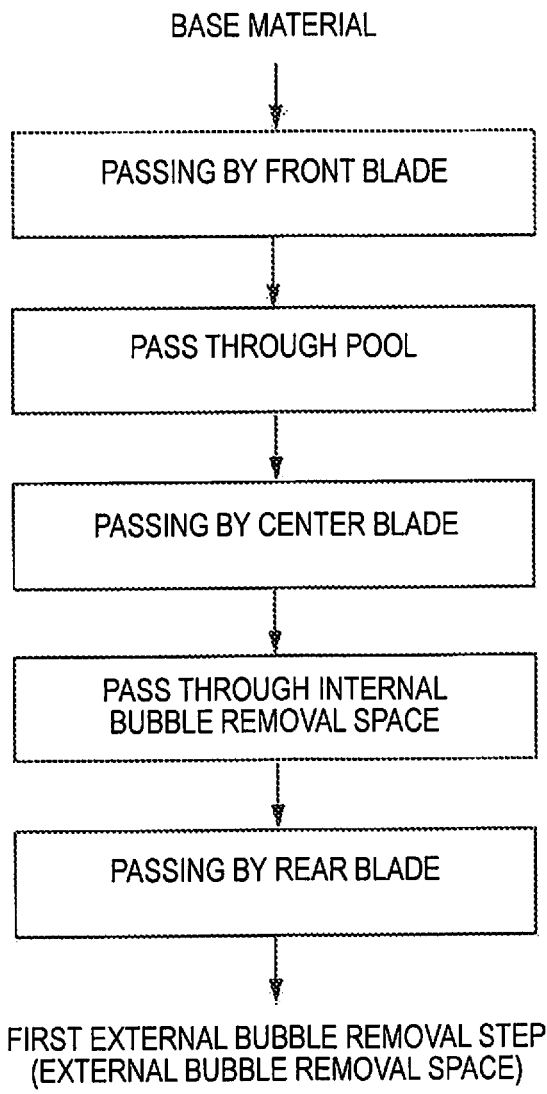
FIG. 9 is a flow chart for explaining a first coating film forming step shown in FIG. 8.

FIG. 9 is a flow chart for explaining a first coating film formation step shown in FIG. 8.

The substrate 80 that is fed from the feed roll 111 passes the front blade 130A (refer to FIG. 7).

The substrate 80 then passes through the pool of the slurry $S_A$ formed between the front blade 130A and the center blade 140A, and, thus applying the slurry $S_A$ with the center blade 140A and forming the coating film.

At this time, the irregularly shaped portion (sloped portion) 142 of the center blade 140A functions as a rotation application part that applies a rotary force to the slurry $S_A$, and the bubbles contained in the slurry $S_A$ do not remain and are efficiently fed to the back surface 144 of the center blade 140A without aggregating to form large bubbles.

The substrate 80 then passes through the internal bubble removal space 150A. At this time, since the thickness of the coating film formed on the substrate 80 is thin, the bubbles contained in the coating film are removed when the bubbles float to the surface of the coating film and escape.

The substrate 80 then passes by the rear blade 160A. At this time, since the distance $D_{2A}$ separating the rear blade 160A and the substrate 80 is set smaller than the distance $D_{1A}$ separating the center blade 140A and the substrate 80, the surface of the coating film formed on the substrate 80 is smoothed (corrected) by means of the ironing effect of the press; in this way, the coating film 42 is formed with uniform thickness.

In addition, the distance $D_{3A}$ separating the substrate 80 and the start position SP of the irregularly shaped portion (curved portion) 162 of the rear blade 160A is set larger than the distance $D_{1A}$ separating the center blade 140A and the substrate 80. Accordingly, the irregularly shaped portion (curved portion) 162 functions as a guide portion that guides the bubbles contained in the coating film to the surface of the coating film to thereby efficiently remove the air bubbles contained in the coating film. Thereafter, the substrate 80 is transported to the first external bubble removal step (external bubble removal space 180A).

As described above, by means of the coating method according to the first coating film forming step, it is possible to form the coating film 42 with uniform thickness without bubble failures (impurity failures) and without using a dedicated bubble removal device (for the removal of impurities).

The operations of the second and third coating film forming steps to which the die head apparatuses 120B, 120C are applied have essentially the same configuration as the operation of the first coating film forming step to which the die head apparatus 120A is applied, so that the descriptions thereof are omitted.

Next, a performance evaluation of examples produced by means of the coating method according to the present embodiment will be described.

In the performance evaluation, the thicknesses of the solid electrolyte layers and the anode layers were compared in terms of uniformity. The uniformity of thickness was evaluated by examining the variation in thickness of each layer. The bubble removal effect was compared for the metal support layers. The bubble removal effect was evaluated based on the bubble generation rate. Comparative examples were formed using a film applicator (doctor blade) manufactured by Yasuda Seiki Seisakusho. In the formation of the metal support layers in the comparative example, the slurry constituting the metal support layer was applied in a state in which bubbles were contained in the slurry and was not subjected to preliminary bubble removal.

The absolute value of the variation in the thicknesses of the solid electrolyte layers was 5 μm for the examples and 21 μm for the comparative examples. The absolute value of the variation in the thicknesses of the anode layers was 3 μm for the examples and 25 μm for the comparative examples. The bubble generation rate per 100 mm$^2$ of the metal support layer was 10 for the examples and greater than or equal to 200 for the comparative example.

As described above, unlike the comparative examples, the examples had a good uniformity of thickness and a low bubble generation rate.

Next, first and second modified examples are described.

In the following FIGS. 10A to 18, the casing, the front blades, the center blades, the internal bubble removal spaces, and the rear blades of the die head apparatuses 120A, 120B, 120C are respectively designated by reference numerals 122, 130, 140, 150, and 160. The slurries $S_A$, $S_B$, $S_C$ are designated by the reference symbol S. In addition, the distances separating the front blade 130, the center blade 140, and the rear blade 160 from the substrate 80 are represented by the setting of the die head apparatus 120A.

Figure 10A:
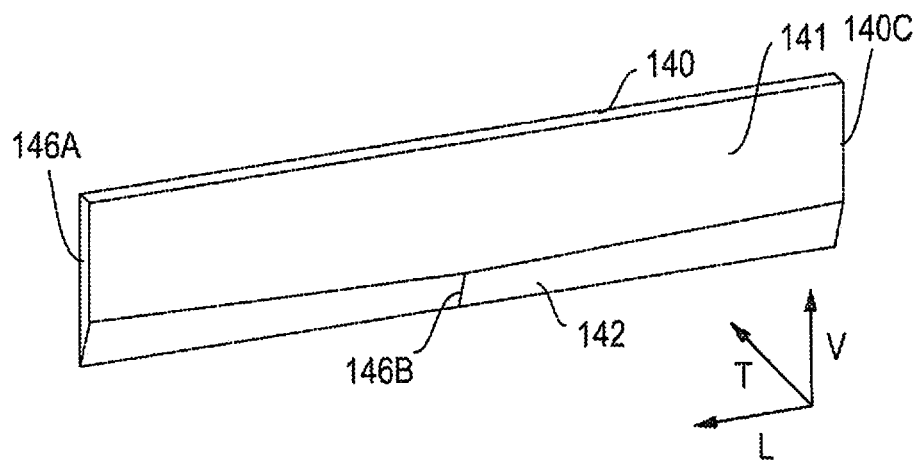
FIG. 10A is a perspective view for explaining a first modified example according to the embodiment of the present invention.
Figure 10B:
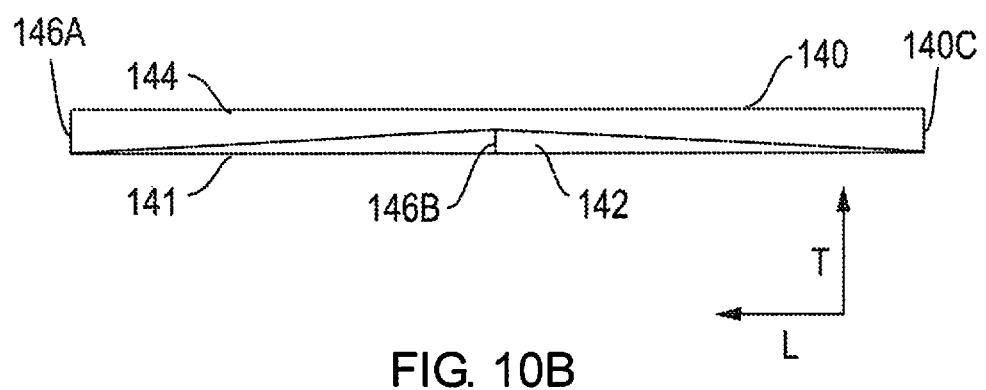
FIG. 10B is a bottom surface view for explaining the first modified example according to the embodiment of the present invention.
Figure 11A:
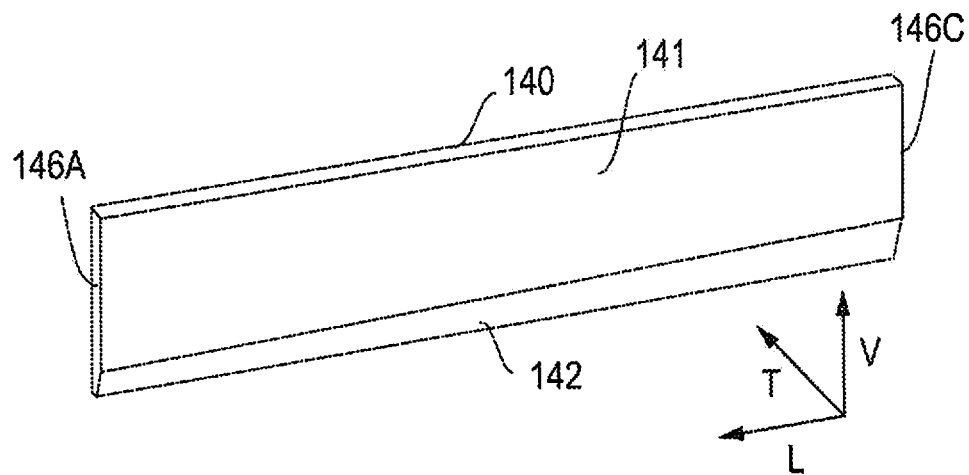
FIG. 11A is a perspective view for explaining a second modified example according to the embodiment of the present invention.
Figure 11B:
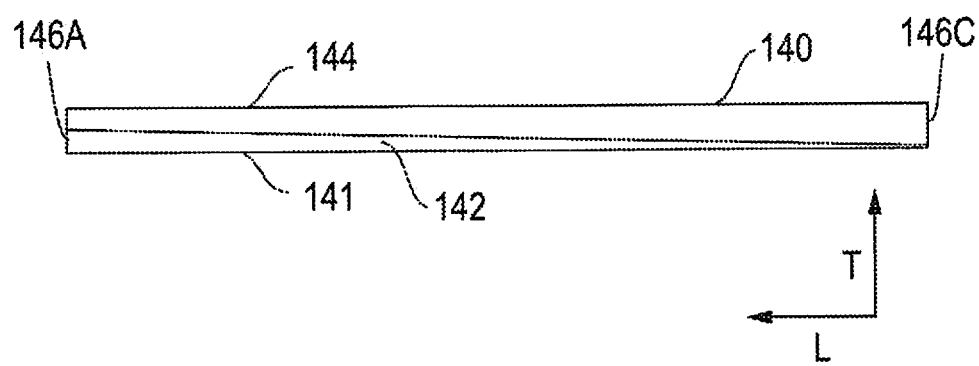
FIG. 11B is a bottom surface view for explaining the second modified example according to the embodiment of the present invention.

FIGS. 10A and 10B are a perspective view and a bottom surface view for explaining the first modified example according to the embodiment of the present invention, and FIGS. 11A and 11B are a perspective view and a bottom surface view for explaining the second modified example according to the embodiment of the present invention.

The angle of inclination of the irregularly shaped portion 142 of the center blade 140 preferably is constant with respect to the transport direction T and the vertical direction V when the slurry is constantly fed in a state of evenly spreading out in the lateral direction. However, there are cases in which turbulent flow occurs in the slurry in the slurry pool that is formed between the center blade 140 and the front blade. In this case, it is preferable to laminarize the flow of the slurry by changing the width of the distal end portion of the center blade 140 and the angle of inclination of the irregularly shaped portion 142 in the lateral direction L.

For example, when the slurry supply part 124 is disposed above the central portion of the slurry pool and the flow of the slurry from the central portion to the two ends occurs in the slurry pool, as shown in FIGS. 10A and 10B, it is preferable to laminarize the flow of the slurry by making the width of the distal end portion of the central portion 146B of the center blade 140 in the lateral direction L thicker than the width of the distal end portions on the both ends 146A, 146C.

In addition, for example, when the slurry supply part 124 is disposed above one end of the slurry pool and the flow of the slurry from the one end to the other end occurs in the slurry pool, as shown in FIGS. 11A and 11B, it is preferable to laminarize the flow of the slurry by making the width of the distal end portion of the one end 146A of the center blade 140 in the lateral direction L thicker than the width of the distal end portions of the other end 146C.

Next, third and fourth modified examples are described.

Figure 12:
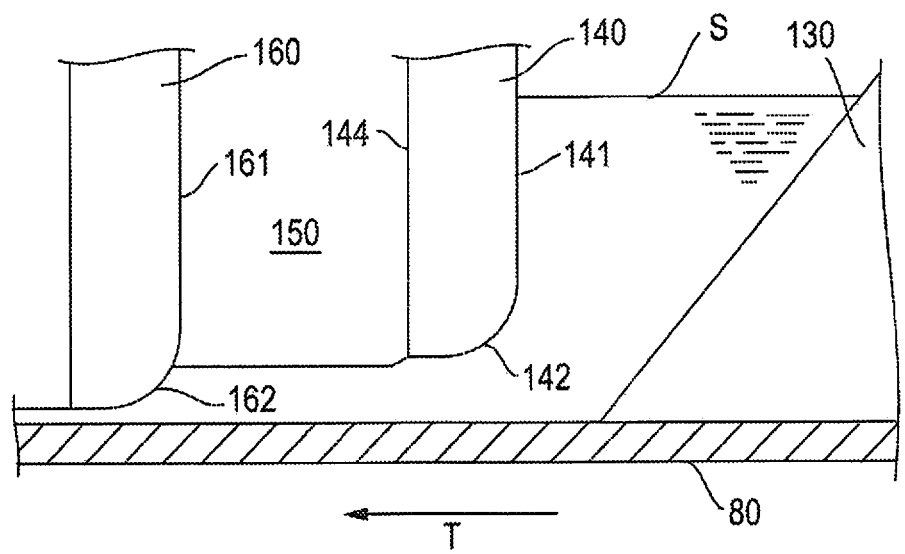
FIG. 12 is a cross-sectional view for explaining a third modified example according to the embodiment of the present invention.
Figure 13:
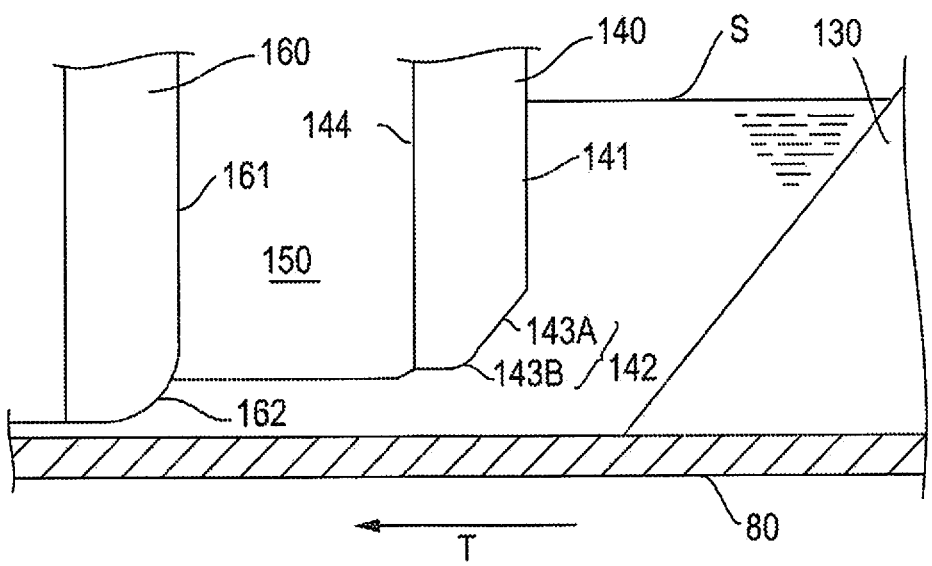
FIG. 13 is a cross-sectional view for explaining a fourth modified example according to the embodiment of the present invention.

FIGS. 12 and 13 are cross-sectional views for explaining the third and fourth modified examples according to the embodiment of the present invention.

The irregularly shaped portion 142 of the center blade 140 constituting the rotation application portion that applies a rotational force to the slurry S is not limited to being configured by the sloped portion. For example, the irregularly shaped portion 142 can also be configured from the curved portion shown in FIG. 12, or from a shape that has both the curved portion 143B and the inclined portion 143A shown in FIG. 13.

Next, a fifth modified example is described.

Figure 14:
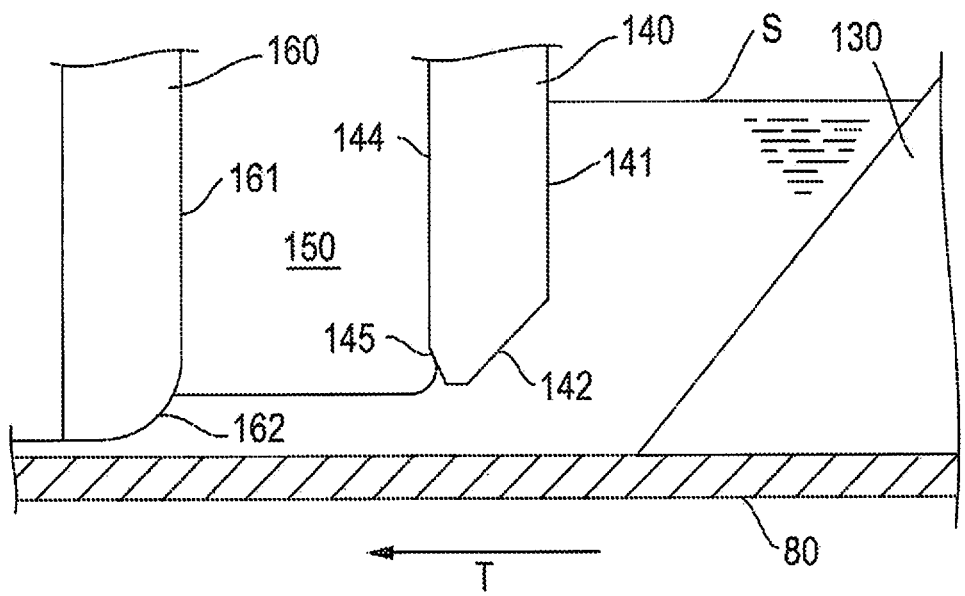
FIG. 14 is a cross-sectional view for explaining a fifth modified example according to the embodiment of the present invention.

FIG. 14 is a cross-sectional view for explaining the fifth modified example according to the embodiment of the present invention.

The center blade 140 preferably has a guide portion 145 on the back surface 144 of the distal end portion. The guide portion 145 comprises, for example, the inclined portion shown in FIG. 14, and is configured to guide the coating film of the slurry S away from the substrate 80 and toward the internal bubble removal space 150. In this case, the slurry S is discharged so as to be guided by the guide portion 145 and expand, so that efficient removal of the air bubbles contained in the slurry S is possible.

Next, sixth to eighth modified examples are described.

Figure 15:
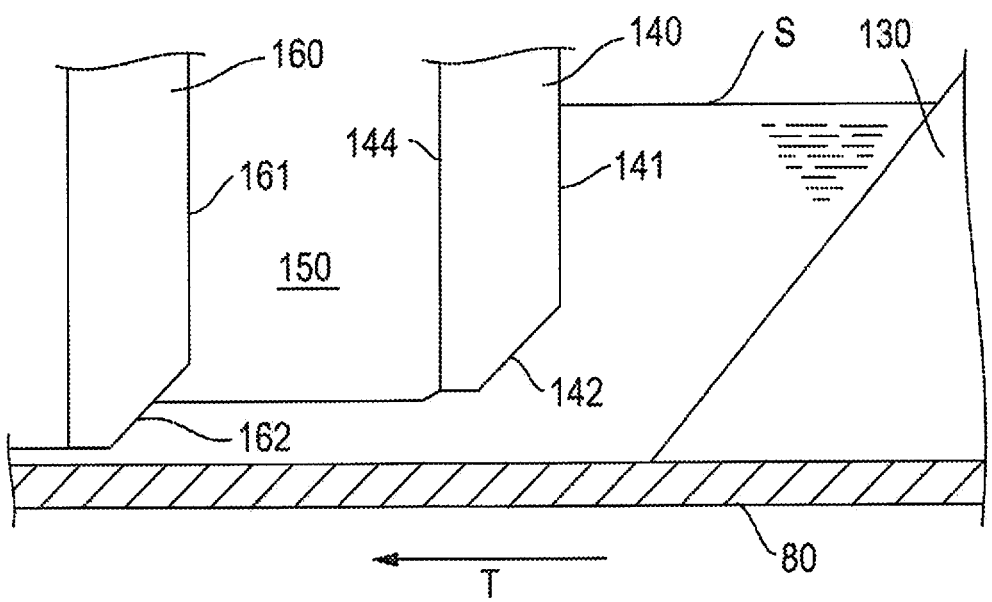
FIG. 15 is a cross-sectional view for explaining a sixth modified example according to the embodiment of the present invention.
Figure 16:
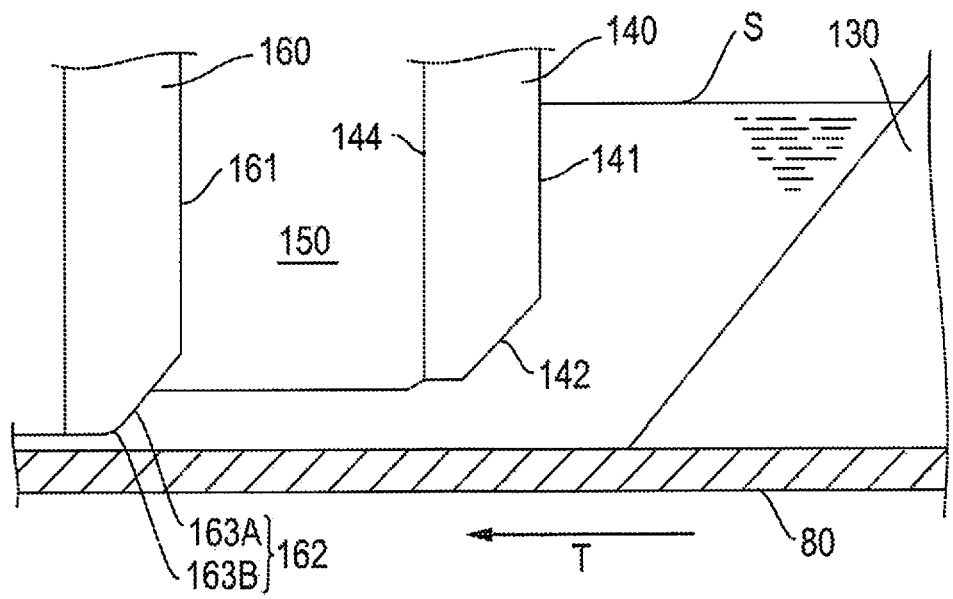
FIG. 16 is a cross-sectional view for explaining a seventh modified example according to the embodiment of the present invention.
Figure 17:
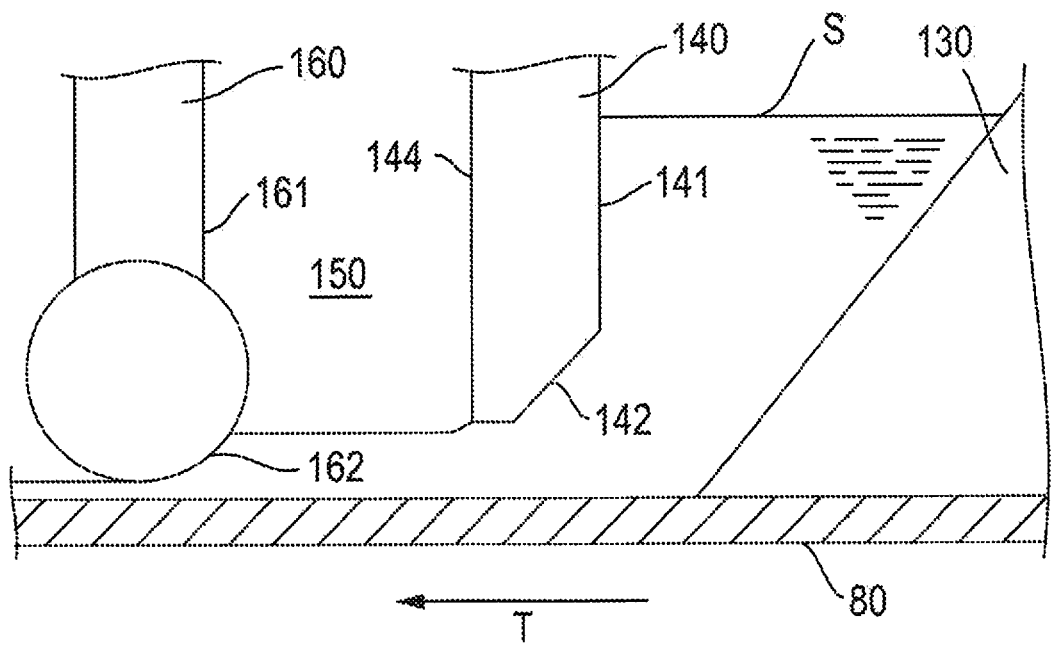
FIG. 17 is a cross-sectional view for explaining an eighth modified example according to the embodiment of the present invention.

FIGS. 15-17 are cross-sectional views for explaining the sixth to the eighth modified examples according to the embodiment of the present invention.

The irregularly shaped portion 162 of the rear blade 160 constituting the guide portion that guides the bubbles contained in the coating film of the slurry S to the surface of the coating film is not limited to being comprised of the quarter-circle (fan-shaped) curved portion. For example, the irregularly shaped portion 162 can also be configured from the inclined portion shown in FIG. 15, configured from a shape that has both the curved portion 163B and the inclined portion 163A shown in FIG. 16, or be configured from the roller-shaped curved portion shown in FIG. 17. If the irregularly shaped portion 162 is configured by the roller-shaped curved portion, it is possible to reliably smooth (correct) the surface of the coating film.

Next, a ninth modified example is described.

Figure 18:
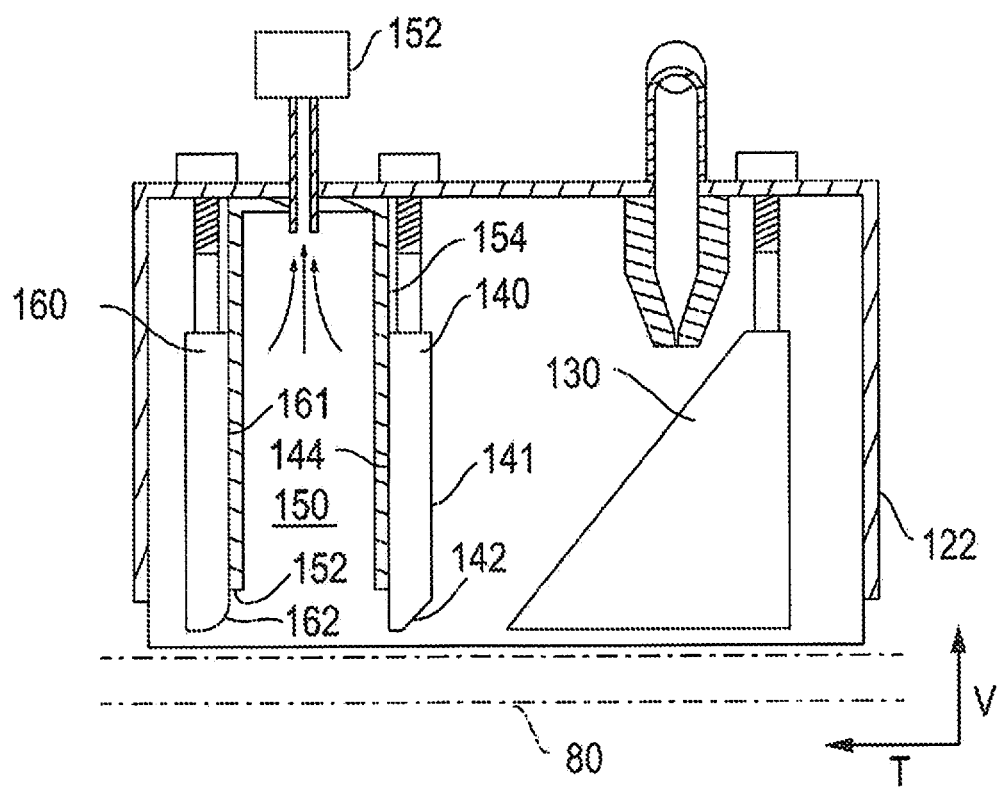
FIG. 18 is a cross-sectional view for explaining a ninth modified example according to the embodiment of the present invention.

FIG. 18 is a cross-sectional view for explaining the ninth modified example according to the embodiment of the present invention.

The internal bubble removal space 150 is not limited to the mode of being under atmospheric pressure (open system), and may be under negative pressure. In this case, since it becomes easy for the bubbles contained in the coating film of the slurry to float to the surface, the bubbles are reliably removed.

The negative pressure of the internal bubble removal space 150 can be achieved by, for example, disposing a hollow vessel 154 and a vacuum pump 152 in the die head apparatus, as shown in FIG. 18.

The hollow vessel 154 has an opening 156 at the bottom and is disposed in the internal bubble removal space 150 positioned between the center blade 140 and the rear blade 160. The opening 156 is positioned to face the substrate 80 that has passed the center blade 140.

The vacuum pump 152 is connected to the hollow vessel 154 and is configured to be capable of placing the inside of the hollow vessel 154 at negative pressure by drawing the air from the interior of the hollow vessel 154. In order to facilitate the generation of the negative pressure, the distance separating the opening 156 of the hollow vessel 154 and the substrate 80 on which the coating film is formed is preferably small.

Next, a tenth modified example is described.

Figure 19:
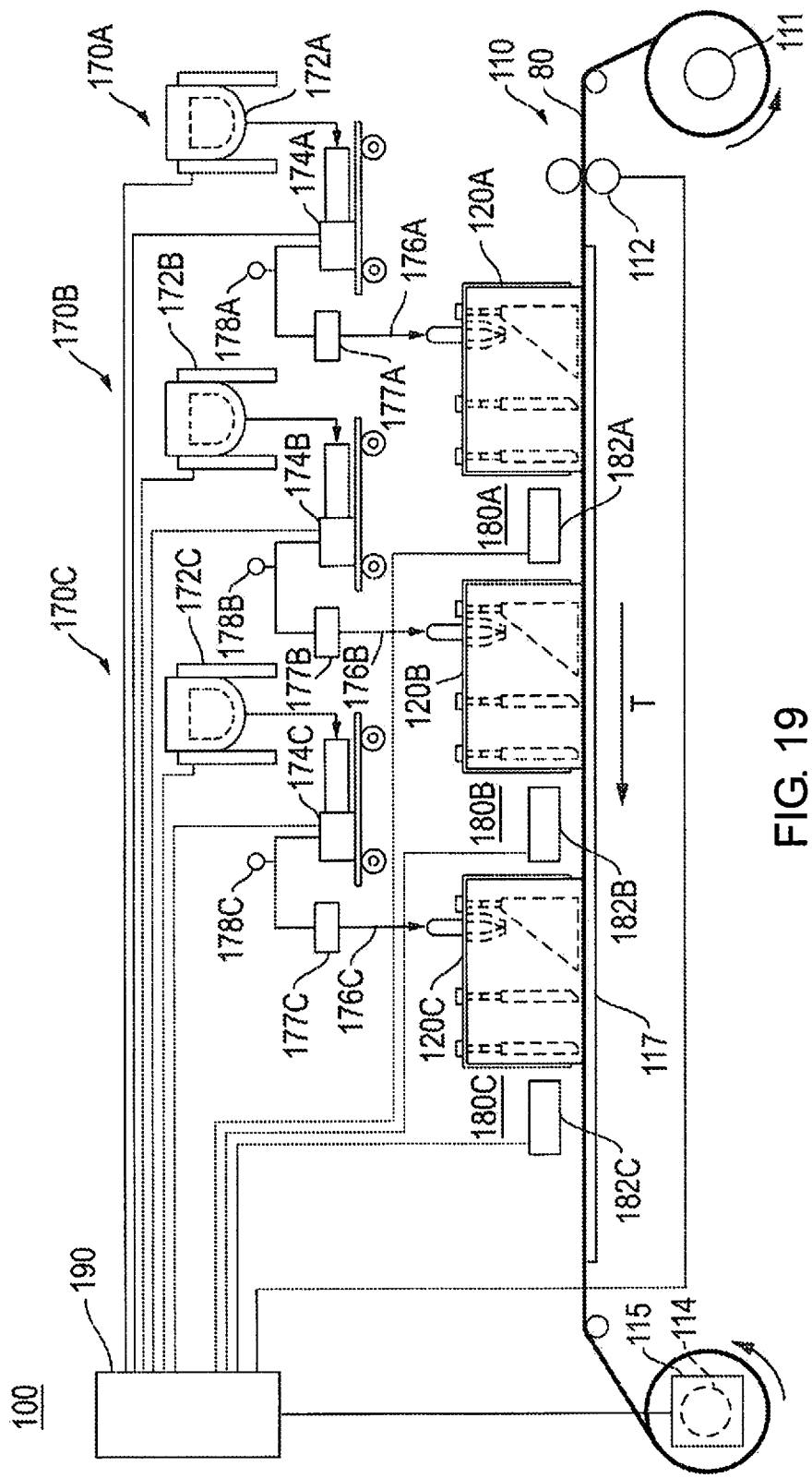
FIG. 19 is a side view for explaining a tenth modified example according to the embodiment of the present invention.

FIG. 19 is a side view for explaining the tenth modified example according to the embodiment of the present invention.

As shown in FIG. 19, the laminated body forming apparatus 100 can further comprise temperature control devices 182A, 182B, 182C for promoting the drying of the coating film.

The temperature control devices 182A, 182B, 182C include a hot air generator, an infrared irradiation device, and the like, are disposed in the external bubble removal spaces 180A, 180B, 180C and are configured to be capable of drying the coating film by increasing the temperature of the coating film.

The temperature control devices 182A, 182B, 182C are not limited to being disposed in the external bubble removal spaces 180A, 180B, 180C and may be disposed on the lower side (back surface side) of the substrate 80. In addition, the temperature control devices 182A, 182B, 182C are not limited to being independent and may be integrated (incorporated) with the die head apparatuses 120A, 120B, 120C.

Next, an eleventh modified example is described.

Figure 20:
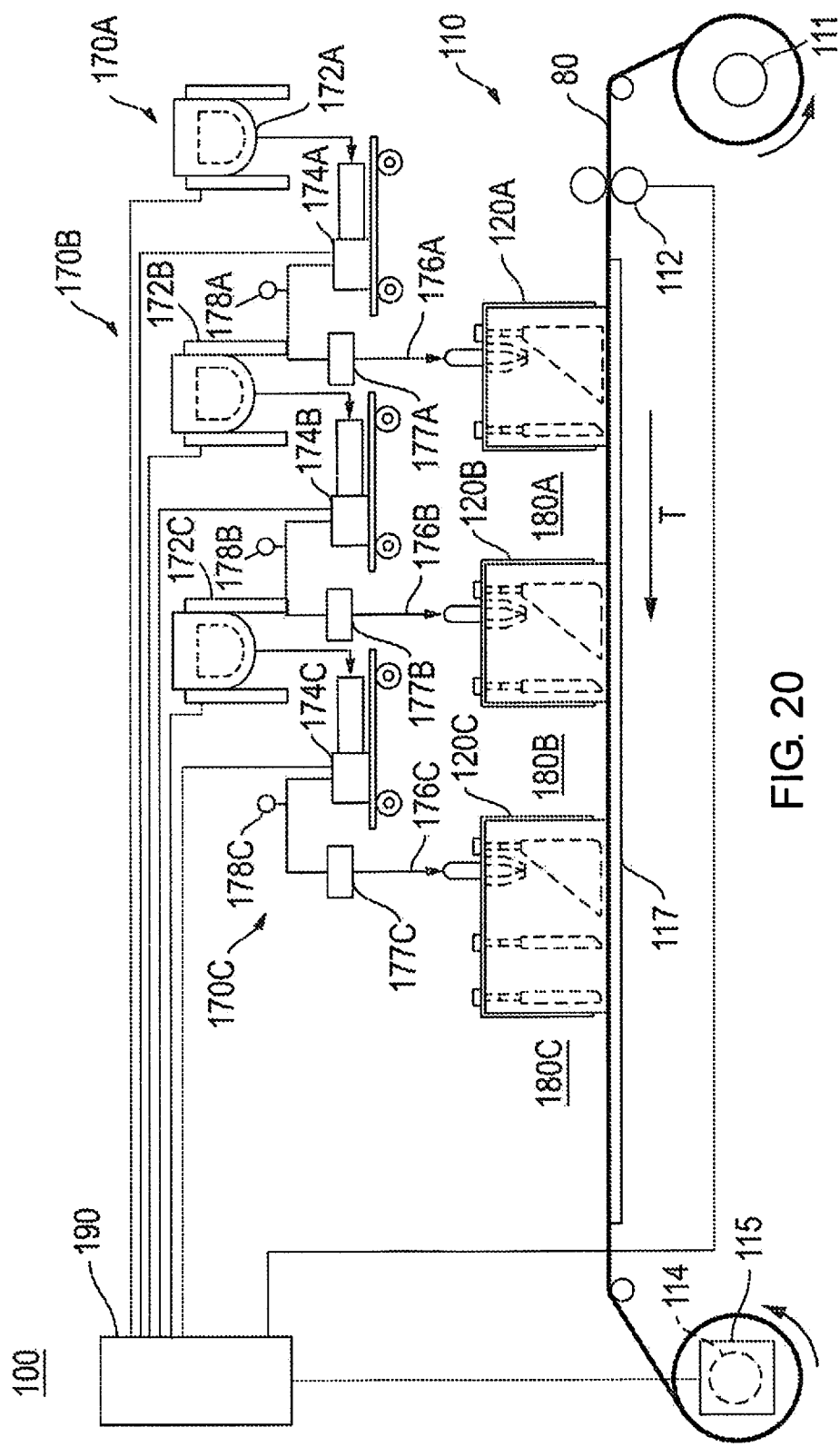
FIG. 20 is a side view for explaining an eleventh modified example according to the embodiment of the present invention.
Figure 21A:
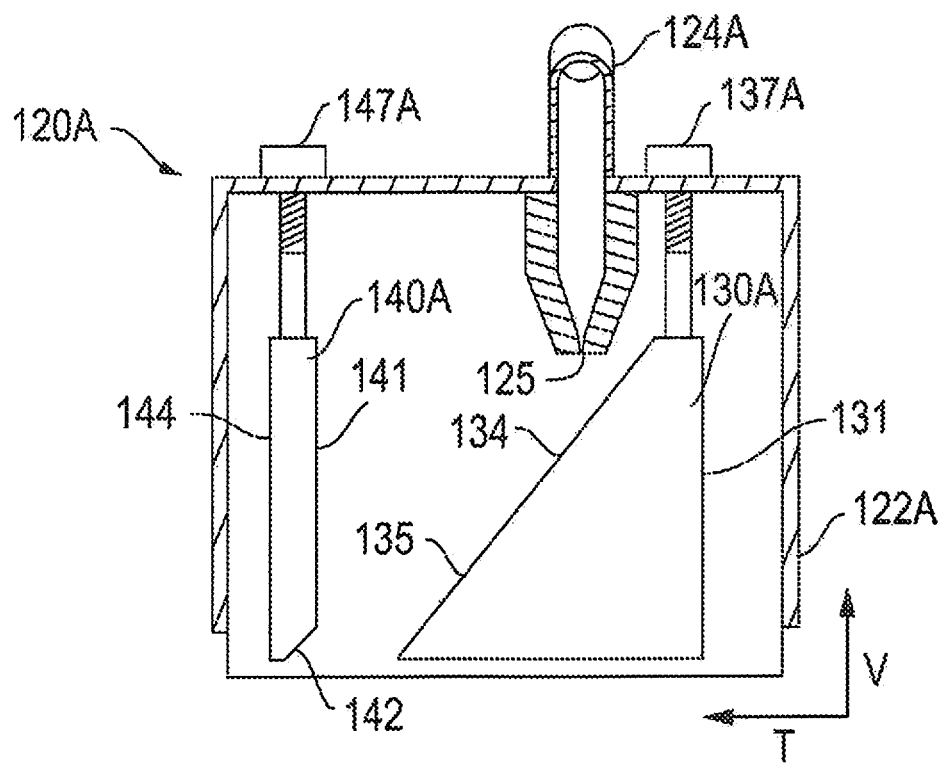
FIG. 21A is a cross-sectional view for explaining the die head apparatus positioned on a most upstream side of a transport direction shown in FIG. 20.
Figure 21B:
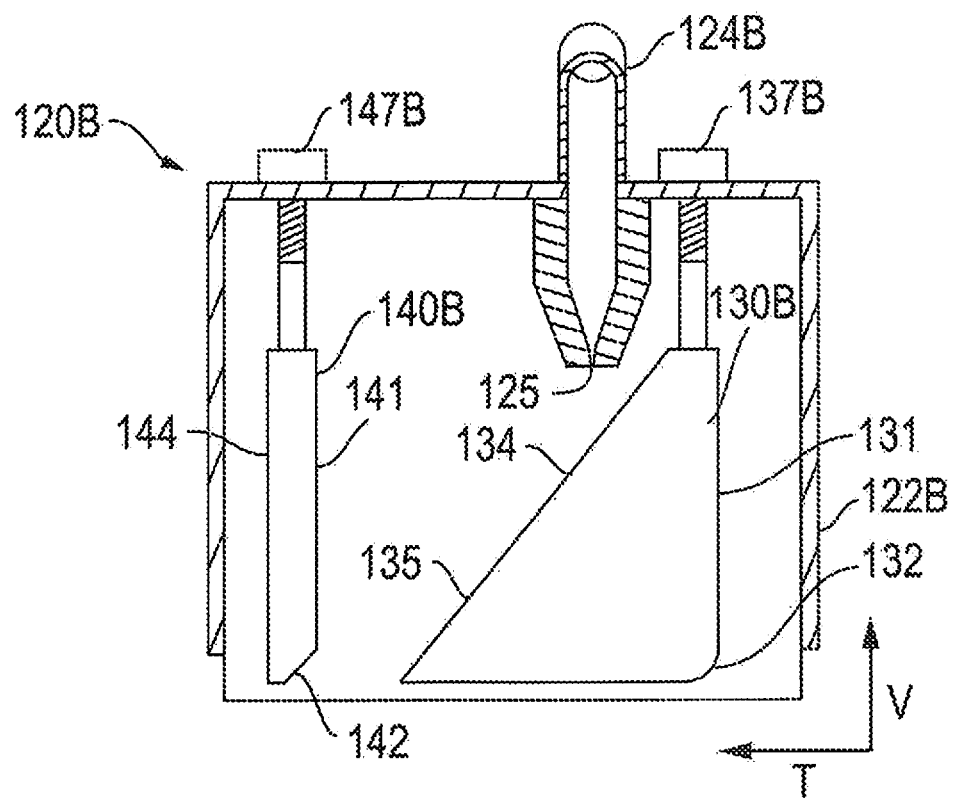
FIG. 21B is a cross-sectional view for explaining the die head apparatus positioned downstream of the die head apparatus of FIG. 21A in the transport direction.
Figure 21C:
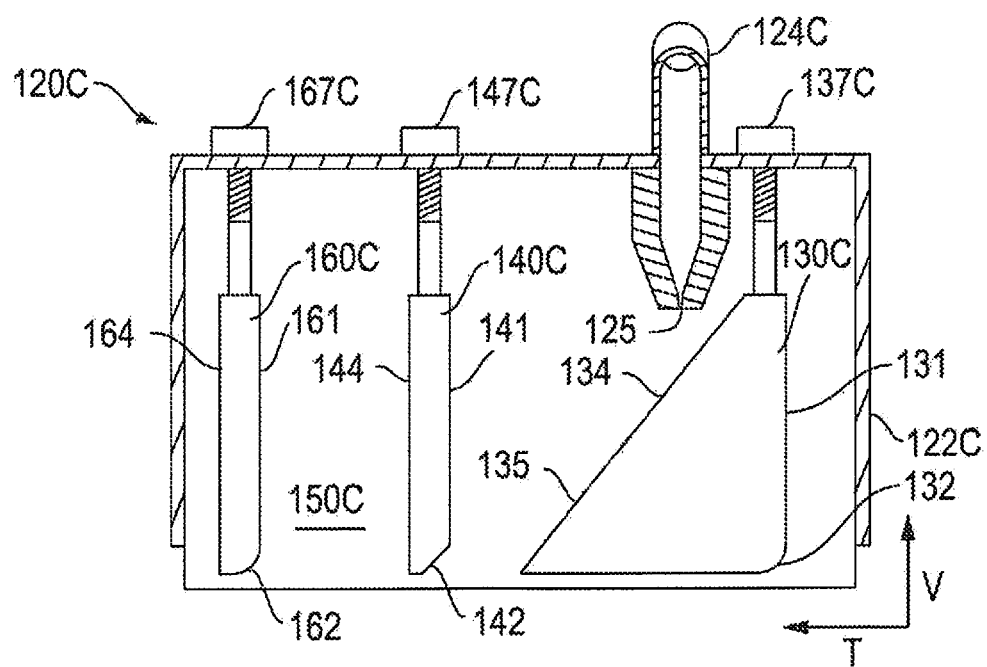
FIG. 21C is a cross-sectional view for explaining the die head apparatus positioned downstream of the die head apparatus of FIG. 21B in the transport direction.
Figure 22:
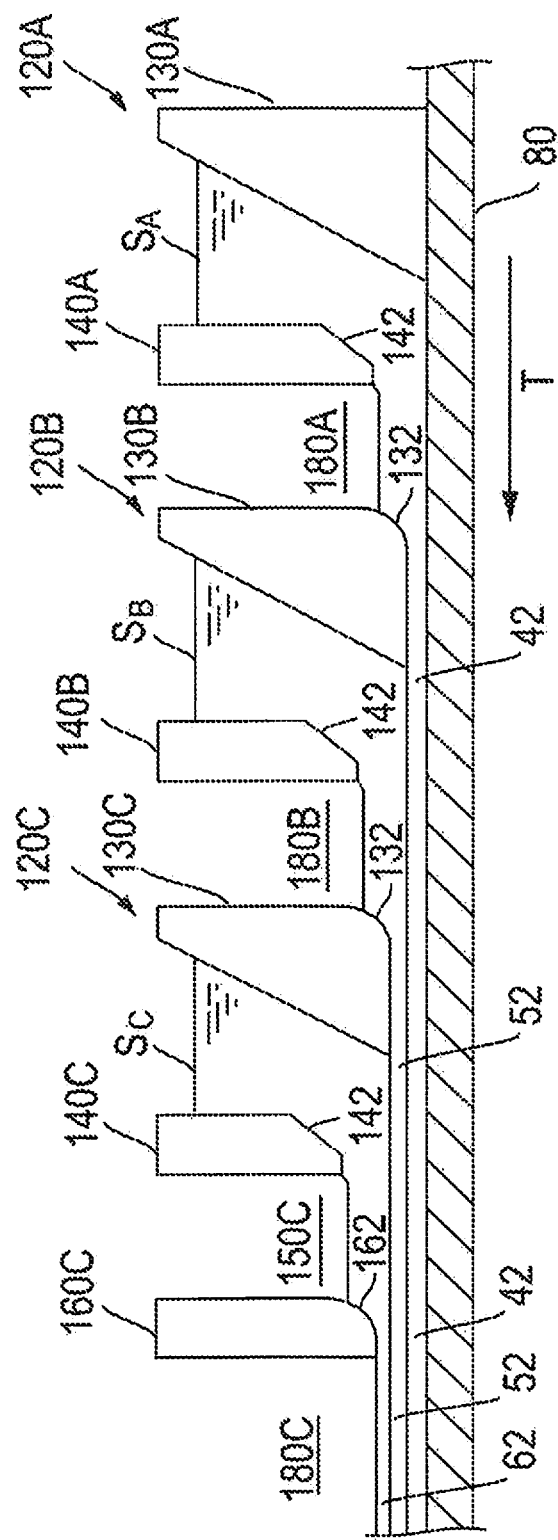
FIG. 22 is a schematic view for explaining the formation of the laminated body by the laminated body forming apparatus shown in FIG. 20.

FIG. 20 is a side view for explaining the eleventh modified example according to the embodiment of the present invention; FIGS. 21A, 21B, and 21C are cross-sectional views for explaining each of the die head apparatuses shown in FIG. 20; and FIG. 22 is a schematic view for explaining the formation of the laminated body by the laminated body forming apparatus shown in FIG. 20.

The laminated body forming apparatus 100 shown in FIG. 20 includes die head apparatuses 120A, 120B, 120C having different configurations, and the device configuration is simplified compared to the laminated body forming apparatus 100 shown in FIG. 2.

As shown in FIG. 21A, the die head apparatus 120A positioned on the farthest upstream side in the transport direction T does not have the internal bubble removal space 150A and the rear blade 160A.

As shown in FIG. 21B, the die head apparatus 120B positioned downstream of the die head apparatus 120A in the transport direction T does not have the internal bubble removal space 150B and the rear blade 160B and has an irregularly shaped portion 132 on the front surface 131 of the front blade 130B. The distance separating the front blade 130B and the substrate 80 is set smaller than the distance separating the center blade 140A of the die head apparatus 120A and the substrate 80, and the irregularly shaped portion 132 corresponds to the irregularly shaped portion 162 of the rear blade 160A, which is omitted in the die head apparatus 120A.

As shown in FIG. 21C, the die head apparatus 120C positioned downstream of the die head apparatus 120B in the transport direction T has an irregularly shaped portion 132 on the front surface 131 of the front blade 130C. The distance separating the front blade 130C and the substrate 80 is set smaller than the distance separating the center blade 140B of the die head apparatus 120B and the substrate 80, and the irregularly shaped portion 132 corresponds to the irregularly shaped portion 162 of the rear blade 160B, which is omitted in the die head apparatus 120B.

That is, the front blade 130B of the die head apparatus 120B, the external bubble removal space 180A, the front blade 130C of the die head apparatus 120C, and the external bubble removal space 180B also serve respectively as the rear blade 160A of the die head apparatus 120A, the internal bubble removal space 150A of the die head apparatus 120A, the rear blade 160B of the die head apparatus 120B, and the internal bubble removal space 150B of the die head apparatus 120B.

Specifically, as shown in FIG. 22, the substrate 80 passes through the pool of the slurry $S_A$ and the center blade 140A, thus, applying the slurry $S_A$ and forming the coating film.

The substrate 80 then passes through the external bubble removal space 180A. At this time, since the thickness of the coating film of the slurry $S_A$ is thin, the bubbles contained in the coating film are removed by floating to the surface of the coating film and escaping.

The substrate 80 then passes by the front blade 130B of the die head apparatus 120B. At this time, the surface of the coating film of the slurry $S_A$ is smoothed (corrected) by means of the ironing effect of the press, thereby forming the coating film 42 with a uniform thickness. Additionally, the irregularly shaped portion (curved portion) 132 of the front blade 130B functions as a guide portion that guides the bubbles contained in the coating film to the surface of the coating film to thereby efficiently remove the bubbles contained in the coating film 42.

The substrate 80 then passes through the pool of the slurry $S_B$ and the center blade 140B, thus applying the slurry $S_B$ and forming the coating film.

The substrate 80 then passes through the external bubble removal space 180B. At this time, since the thickness of the coating film of the slurry $S_B$ is thin, the bubbles contained in the coating film are removed by floating to the surface of the coating film and escaping.

The substrate 80 then passes by the front blade 130C of the die head apparatus 120C. At this time, the surface of the coating film is smoothed (corrected) by means of the ironing effect of the press, thereby forming the coating film 52 with a uniform thickness. Additionally, the irregularly shaped portion (curved portion) 132 of the front blade 130C functions as a guide portion that guides the bubbles contained in the coating film to the surface of the coating film, thereby effecting the efficient removal of the bubbles contained in the coating film.

The substrate 80 then passes through the pool of the slurry $S_C$ and the center blade 140C, thus, applying the slurry $S_C$ and forming the coating film.

Thereafter, the substrate 80 passes through the internal bubble removal space 150C. At this time, since the thickness of the coating film of the slurry $S_C$ is thin, the bubbles contained in the coating film are removed by floating to the surface of the coating film and escaping.

The substrate 80 then passes by the rear blade 160C. At this time, the surface of the coating film is smoothed (corrected) by use of the ironing effect of the press, thereby forming the coating film 62 with uniform thickness. Additionally, the irregularly shaped portion (curved portion) 162 of the front blade 160C functions as a guide portion that guides the bubbles contained in the coating film to the surface of the coating film to thereby efficiently remove the bubbles contained in the coating film. The substrate 80 then passes through the external bubble removal space 180C.

As described above, by use of the die head apparatus and the coating method according to the present embodiment, since the thickness of the slurry is thin after passing by the center blade, in the internal bubble removal space (internal impurity removal space) positioned between the center blade and the rear blade, the bubbles (impurities) contained in the coating film of the slurry are removed by floating to the surface of the coating film and escaping. In addition, the slurry surface is smoothed (corrected) when the substrate passes by the rear blade, thereby forming the coating film with a uniform thickness. Accordingly, it is possible to provide a coating method and die head apparatus that can form a coating film of uniform thickness without bubble failures (impurity failures) and without using a dedicated bubble removal device (for the removal of impurities).

In the laminated body forming apparatus according to the present embodiment, the incorporated die head apparatus is able to form the coating film with uniform thickness without bubble failures and without using a dedicated device for bubble removal. In addition, in the coating film formed by the die head apparatus, the remaining bubbles are removed in the external bubble removal space (external impurity removal space), after which another slurry is applied to the surface thereof by another die head apparatus, thereby forming the laminated body of the coating film. Accordingly, it is possible to provide the laminated body forming apparatus that can form the laminated body of the coating film of uniform thickness without bubble failures and without using a dedicated device for bubble removal.

The center blade preferably has a rotation application portion that applies a rotational force to the slurry of the pool. In this case, it is possible to efficiently feed the bubbles contained in the coating film of the slurry to the internal bubble removal space.

The rotation application portion can be configured from an irregularly shaped portion having an inclined portion and/or a curved portion. In this case, the rotation application portion is embodied in a simple configuration.

The center blade preferably has a guide portion that guides the slurry in a direction away from the substrate and toward the internal bubble removal space. In this case, the slurry S is discharged so as to be guided by the guide portion and expand, so that efficient removal of the air bubbles contained in the slurry is possible.

The guide portion can be configured from an inclined portion. In this case, the guide portion of the center blade is embodied in a simple configuration.

The rear blade preferably has a guide portion that guides the bubbles contained in the coating film of the slurry to the surface of the coating film. In this case, it is possible to efficiently remove the air bubbles contained in the slurry.

The guide portion of the rear blade can be configured from an irregularly shaped portion having an inclined portion and/or a curved portion. In this case, the guide portion of the rear blade is embodied in a simple configuration.

The curved portion preferably has a roller shape. In this case, it is possible to reliably smooth (correct) the surface of the coating film.

The internal bubble removal space is preferably at negative pressure. In this case, since the bubbles contained in the coating film of the slurry readily float to the surface, the bubbles can be reliably removed.

In the laminated body forming apparatus, it is possible to simplify the device configuration by configuring the internal bubble removal space and the rear blade of the die head apparatus (first die head apparatus) to also serve as the external bubble removal space positioned on the downstream side in the transport direction and the front blade of the die head apparatus (second die head apparatus).

The front blade of the second die head apparatus preferably has a guide portion that guides the air bubbles remaining in the coating film to the surface of the coating film. In this case, it is possible to efficiently remove the air bubbles that remain in the coating film even after having passed through the external bubble removal space by use of the front blade of the second die head apparatus.

The guide portion of the front blade can be configured from an irregularly shaped portion having an inclined portion and/or a curved portion. In this case, the guide portion of the front blade is embodied in a simple configuration.

The present invention is not limited to the embodiment described above, and various modifications are possible within the scope of the claims. For example, the impurities to be removed is not limited to bubbles (air bubbles), and the present invention may also be applied to dust removal. In addition, it is possible to appropriately combine modified examples 1 to 11.

The invention claimed is:

1. A die head apparatus for forming a coating film by applying a slurry to a substrate that is transported, the die head apparatus comprising:
    a front blade that is positioned to abut a flat surface of the substrate from a direction above the substrate, the substrate extending along a horizontal direction that is orthogonal to a vertical length of the front blade that extends in a direction of gravity;
    a rear blade positioned downstream of the front blade in a transport direction of the substrate;
    a center blade positioned between the front blade and the rear blade; and
    an internal impurity removal space positioned between the center blade and the rear blade that removes impurities contained in a coating film of the slurry formed by passing by the center blade;
    the front blade and the center blade being configured to form a pool of the slurry, and
    a distance separating the rear blade and the substrate being set smaller than a distance separating the center blade and the substrate.

2. The die head apparatus according to claim 1, wherein the center blade has a rotation application portion that applies a rotational force to the slurry in the pool.

3. The die head apparatus according to claim 2, wherein the rotation application portion is configured from an irregularly shaped portion formed on a surface of the center blade facing the front blade, and
    the irregularly shaped portion has at least one of an inclined portion and a curved portion.

4. The die head apparatus according to claim 1, wherein the center blade has a guide portion that guides the slurry constituting the coating film in a direction away from the substrate and toward the internal impurity removal space.

5. The die head apparatus according to claim 4, wherein the guide portion is configured from an inclined portion formed on a surface of the center blade facing the rear blade.

6. The die head apparatus according to claim 1, wherein the rear blade has a guide portion that guides impurities contained in the coating film to a surface of the coating film.

7. The die head apparatus according to claim 6, wherein the guide portion of the rear blade is configured from an irregularly shaped portion formed on a surface of the rear blade facing the center blade,
    the irregularly shaped portion has at least one of an inclined portion and a curved portion, and
    a distance separating a start position of the irregularly shaped portion and the substrate is set to be larger than the distance separating the center blade and the substrate.

8. The die head apparatus according to claim 7, wherein the curved portion of the irregularly shaped portion constituting the guide portion of the rear blade has a roller shape.

9. The die head apparatus according to claim 1, wherein the internal impurity removal space is under negative pressure.

10. The die head apparatus according to claim 1, wherein the impurities are bubbles or dust.

11. A laminated body forming apparatus comprising a plurality of the die head apparatuses according to claim 1 for forming a laminated body on the substrate that is transported, wherein
    the plurality of the die head apparatuses are arranged in series along the transport direction of the substrate, and the laminated body forming apparatus further comprises
    a plurality of external impurity removal spaces that remove impurities contained in a coating film of a slurry are respectively provided on downstream sides of the plurality of die head apparatuses in the transport direction.

12. The laminated body forming apparatus according to claim 11, wherein
    the impurities are bubbles or dust.

13. The laminated body forming apparatus according to claim 1, wherein
    the front blade has a triangular cross-sectional shape with a slanting edge that faces the center blade.

14. A coating method for forming a coating film by applying a slurry to a substrate that is transported by use of a die head apparatus, which has a front blade positioned to abut a flat surface of the substrate from a direction above the substrate, the substrate extending along a horizontal direction that is orthogonal to a vertical length of the front blade that extends in a direction of gravity, a rear blade positioned downstream of the front blade in a transport direction of the substrate, a center blade positioned between the front blade and the rear blade, and an internal impurity removal space positioned between the center blade and the rear blade, and in which a distance separating the rear blade and the substrate is set to be smaller than a distance separating the center blade and the substrate, the coating method comprising:

applying the slurry to the substrate to form the coating film with the center blade as the substrate passing through the slurry pool that is formed between the front blade and the center blade;

removing the impurities contained in the coating film of the slurry that is applied to the substrate as the substrate passes through the internal impurity removal space by floating the impurities to a surface of the coating film so that the impurities escape; and forming the coating film with a uniform thickness by smoothing the surface of the coating film as the substrate passes the rear blade.

15. The coating method according to claim 14, wherein the impurities are bubbles or dust.

16. A laminated body forming apparatus, comprising:
a plurality of die head apparatuses for forming a coating film by applying a slurry to a substrate that is transported, each of the die head apparatuses comprising,
a front blade,
a rear blade positioned downstream of the front blade in a transport direction of the substrate,
a center blade positioned between the front blade and the rear blade, and
an internal impurity removal space positioned between the center blade and the rear blade that removes impurities contained in a coating film of the slurry formed by passing by the center blade,
the front blade and the center blade being configured to form a pool of the slurry, and a distance separating the rear blade and the substrate being set smaller than a distance separating the center blade and the substrate,
the plurality of die head apparatuses being arranged in series along the transport direction of the substrate, and
the laminated body forming apparatus further comprises a plurality of external impurity removal spaces that remove impurities contained in a coating film of a slurry are respectively provided on downstream sides of the plurality of die head apparatuses in the transport direction,
the plurality of the die head apparatuses including
a first die head apparatus, and
a second die head apparatus that is adjacent to the first die head apparatus and that is positioned downstream of the first die head apparatus in the transport direction of the substrate,
a front blade of the second die head apparatus also serves as a rear blade of the first die head apparatus,
the external impurity removal space positioned between the first die head apparatus and the second die head apparatus also serves as an internal impurity removal space of the first die head apparatus, and
a distance separating the front blade of the second die head apparatus and the substrate is set to be smaller than a distance separating a center blade of the first die head apparatus and the substrate.

17. The laminated body forming apparatus according to claim 16, wherein
the front blade of the second die head apparatus has a guide portion that guides impurities remaining in the coating film that has passed through the external impurity removal space to the surface of the coating film.

18. The laminated body forming apparatus according to claim 17, wherein
the guide portion of the front blade of the second die head apparatus is configured from an irregularly shaped portion formed on a surface of the front blade that faces the center blade of the first die head apparatus,
the irregularly shaped portion of the front blade has at least one of an inclined portion and a curved portion, and
a distance separating the irregularly shaped portion of the front blade and the substrate is set to be greater than the distance separating the center blade of the first die head apparatus and the substrate.

* * * * *